US012723450B2

(12) United States Patent
Baldreich et al.

(10) Patent No.: US 12,723,450 B2
(45) Date of Patent: Sep. 1, 2026

(54) FURNITURE FITTING HAVING AN ADJUSTABLE INSTALLATION POSITION OF A COVERING CAP

(71) Applicant: Julius Blum GmbH, Hoechst (AT)

(72) Inventors: Armin Baldreich, Lauterach (AT); Alexander Simon Flogaus, Eriskirch (DE); Andreas Holzapfel, Bregenz (AT); Dominik Hagspiel, Hoechst (AT); Peter Gabel, Meiningen (DE)

(73) Assignee: JULIUS BLUM GMBH, Hoechst (AT)

( * ) Notice: Subject to any disclaimer, the term of this patent is extended or adjusted under 35 U.S.C. 154(b) by 0 days.

(21) Appl. No.: 18/144,537

(22) Filed: May 8, 2023

(65) Prior Publication Data

US 2023/0272649 A1 Aug. 31, 2023

Related U.S. Application Data

(63) Continuation of application No. PCT/AT2021/060411, filed on Nov. 5, 2021.

(30) Foreign Application Priority Data

Nov. 12, 2020 (AT) .............................. A 50982/2020

(51) Int. Cl.
*E05D 15/40* (2006.01)
*E05D 3/06* (2006.01)
(Continued)

(52) U.S. Cl.
CPC .......... *E05D 11/0054* (2013.01); *E05D 15/40* (2013.01); *E05D 3/06* (2013.01);
(Continued)

(58) Field of Classification Search
CPC ..... E05D 5/0276; E05D 3/06; E05D 11/0054; E05D 15/40; E05F 1/1058; E05F 1/1261;
(Continued)

(56) References Cited

U.S. PATENT DOCUMENTS 9,353,562 B2 5/2016 Oshima et al.
11,319,737 B2 5/2022 Nordieker et al.
(Continued)

FOREIGN PATENT DOCUMENTS

CN 111344471 A 6/2020
CN 111556721 A 8/2020
(Continued)

OTHER PUBLICATIONS

Machine Translation of DE202018102083U1, printed on Nov. 1, 2025, accessed on Espace.net.*
(Continued)

*Primary Examiner* — Kimberley S Wright
(74) *Attorney, Agent, or Firm* — Wenderoth, Lind & Ponack, L.L.P.

(57) ABSTRACT

A furniture fitting includes a main body and a covering cap. The main body can be at least partially inserted in a furniture panel of a furniture carcass, and the covering cap can be installed on the main body to at least partially cover at least one lateral face of the main body in the installed state. The installation position of the covering cap can be adjusted relative to the main body, preferably without tools.

40 Claims, 18 Drawing Sheets

(51) Int. Cl.

| | |
|---|---|
| ***E05D 11/00*** | (2006.01) |
| ***E05F 1/10*** | (2006.01) |
| *E05D 5/02* | (2006.01) |

(52) U.S. Cl.
CPC ......... *E05D 5/0276* (2013.01); *E05Y 2600/58* (2024.05); *E05Y 2900/20* (2013.01)

(58) Field of Classification Search
CPC ............. E05Y 2900/20; E05Y 2600/41; E05Y 2600/52; E05Y 2600/58; E05Y 2201/46; E05Y 2201/10; A47B 96/205
See application file for complete search history.

(56) References Cited

U.S. PATENT DOCUMENTS

| | | | |
|---|---|---|---|
| 2012/0000130 | A1 | 1/2012 | Kashiwaguma |
| 2015/0240546 | A1 | 8/2015 | Oshima et al. |
| 2021/0189780 | A1 | 6/2021 | Nordieker et al. |

FOREIGN PATENT DOCUMENTS

| | | | |
|---|---|---|---|
| DE | 39 42 924 | | 7/1990 |
| DE | 20 2017 101 255 | | 4/2018 |
| DE | 10 2018 100 206 | | 7/2019 |
| DE | 20 2018 102 083 | | 8/2019 |
| EP | 3 020 904 | | 5/2016 |
| EP | 3401481 | A1 | 11/2018 |
| JP | H08-193453 | | 7/1996 |
| WO | 2010/097996 | | 9/2010 |
| WO | 2014/050749 | | 4/2014 |
| WO | 2019/091967 | | 5/2019 |
| WO | 2019/134936 | | 7/2019 |
| WO | 2019/201606 | | 10/2019 |

OTHER PUBLICATIONS

International Search Report issued Jan. 31, 2022 in International (PCT) Application No. PCT/AT2021/060411.

* cited by examiner

A (2 : 3)

A (2 : 3)

B(2:1)

FURNITURE FITTING HAVING AN ADJUSTABLE INSTALLATION POSITION OF A COVERING CAP

BACKGROUND OF THE INVENTION

The invention relates to a furniture fitting for movably mounting a furniture flap on a furniture carcass. The invention furthermore relates to a piece of furniture comprising a furniture fitting and a method for installing at least one furniture fitting.

Furniture fittings of the above-mentioned type are already known in many different embodiments in the state of the art. A generic furniture fitting typically has a main body, which is arranged on the furniture carcass, in particular inside a furniture carcass, and an actuating arm, which holds the furniture flap. In order to bring about a movement of the furniture flap, the main body and the actuating arm are connected to each other in an articulated manner.

In modern embodiments, the main body often includes an energy store, for example in the form of a mechanical spring, or an electric drive. With that, a torque can be applied to the actuating arm and the furniture flap, and the opening movement and/or the closing movement can thus be performed without much assistance from a user, and the furniture flap can be held in an open position. This increases the convenience for the user and is desirable in particular in the case of heavy furniture flaps.

DE 20 2018 102 083 U1 shows a furniture fitting which is integrated in the side wall of a furniture carcass. For this purpose, a cutout, in which the main body can be arranged countersunk, is provided in the furniture carcass. The arrangement in a cutout in the furniture carcass makes a space-saving and esthetic positioning of the main bodies of the furniture fittings possible. This is particularly relevant in the case of furniture fittings with an energy store and/or electric drive, as their main bodies are typically large.

The above-mentioned document furthermore discloses a covering cap for the main body which can be installed without tools.

In DE 20 2018 102 083 U1 this covering cap is preferably arranged level with a surface of the furniture board.

A disadvantage of a covering cap arranged level with the surface of the furniture board is that a more complicated fastening device is needed, as the covering cap cannot be gripped during disassembly.

As a further disadvantage of a covering cap arranged level with the surface of the furniture board, it is to be noted that the edge of the cutout is visible on the furniture board. The edge therefore has to meet the desired esthetic standards and should be worked with precision. This increases the amount of work and the costs during the production of the furniture boards, in particular in the case of the use of coated plywood for the furniture board.

If, on the other hand, the covering cap protrudes beyond the surface of the furniture board, it can cover the edge and can be gripped by a user.

However, with that, the positioning of a second furniture board is limited by the furniture fitting. In particular, this represents a disadvantage as, for a cost-effective production, the milled-out portion is to be identical for the main body in the case of a particular type of furniture board and furniture boards of a particular type are to be able to be built into pieces of furniture which are different from each other, with second furniture boards different from each other or second furniture boards arranged differently.

SUMMARY OF THE INVENTION

Starting from this state of the art, an object of the following invention is to create a furniture fitting, a piece of furniture with a furniture fitting and a method for installing at least one furniture fitting, which at least partly overcomes or reduces the previously described disadvantages.

In particular, a furniture fitting for a piece of furniture is to be created which allows a flexible arrangement of different furniture boards in the area of the furniture fitting.

A furniture fitting according to the invention for movably mounting a furniture flap on a furniture carcass comprises a main body and a covering cap, wherein the main body can be at least partially inserted in a side wall of the furniture carcass, wherein the covering cap can be installed on the main body and in the installed state at least partially covers at least one side surface of the main body.

According to the invention, the installation position of the covering cap can be adjusted relative to the main body, preferably without tools.

Here, the installation position is the position in the installed state.

The position of the covering cap can thus be varied in the case of a main body installed in a fixed position. An altered configuration of different, further furniture boards can thus also be catered for in the case of a covering cap protruding from the surface of the furniture board. An altered configuration can, for example, correspond to an alteration in the positioning or the size, in particular the thickness, of the at least one further furniture board.

For example, the furniture board to which the main body of the furniture fitting is attached can be provided as a side wall of the furniture carcass. The main body can be fastened to the furniture board such that the covering cap butts against a further furniture board formed as a top panel. If it is now desired to displace the top panel downwards or to replace it with a thicker furniture board, this can be realized with the furniture fitting according to the invention, preferably without tools, by displacing the covering cap relative to the main body without altering the position of the main body.

In an embodiment, the installation position of the covering cap can be steplessly adjusted relative to the main body. The covering cap can thus be flexibly adapted to different configurations of different, further furniture boards.

In an embodiment, the furniture fitting has at least one actuating arm which can be connected to the furniture flap and which can be pivoted relative to the main body about an axis of rotation. The furniture flap can be moved by means of the actuating arm.

The main body has a front face with at least one opening, through which the at least one actuating arm reaches in at least one open position, wherein the installation position of the covering cap can be adjusted relative to the main body at least in a direction substantially parallel to the front face of the main body.

If the main body is fastened to a side wall of the piece of furniture, this corresponds to a height adjustability of the covering cap relative to the main body and thus relative to a top panel arranged on the side wall.

It is envisaged that the variation range or adjustment length of the installation position of the covering cap relative to the main body is at least 5 millimeters, preferably at least 10 millimeters. For example, an altered thickness of a furniture board can thus be catered for by displacing the covering cap.

In an embodiment, at least one fastening device is provided, wherein the covering cap can be fastened to the main body with the fastening device, in particular wherein the at least one fastening device can be fastened to the main body and/or to the covering cap.

The at least one fastening device can be a part different from the covering cap and the main body. However, the at least one fastening device can also be formed as part of the covering cap and/or as part of the main body.

The at least one fastening device:

- can be installed on the main body without tools and/or
- can be installed on the covering cap without tools and/or
- the installation position of the at least one fastening device can be adjusted relative to the main body without tools and/or
- the installation position of the at least one fastening device can be adjusted relative to the covering cap without tools.

The covering cap can be fastened, preferably detachably, to the at least one side surface of the main body, preferably exclusively, by the at least one fastening device. The main body can thus be inserted into the cutout in the furniture board accurately fitting and without gaps.

It is conceivable that the at least one side surface of the main body has at least one opening and the at least one fastening device has at least one retaining element, preferably formed resilient, which can be introduced into the at least one opening of the at least one side surface.

At least one catch means, which can be connected to a rear side of the side surface which is opposite a front side facing the covering cap, can be arranged on the at least one retaining element.

The covering cap can thus be installed without tools.

In an embodiment, the at least one fastening device is formed as at least one retaining bracket, in particular wherein:

- the at least one fastening device has at least one tooth system, wherein the tooth system can be fastened to the covering cap on at least one bar with a catch mechanism, and/or
- the at least one fastening device can be installed on the main body by engaging in a recess, and/or
- the installation position of the at least one fastening device can be adjusted relative to the covering cap without tools.

The covering cap is displaceable with respect to the at least one fastening device through the mutual catching of the fastening device and the covering cap by a tooth system and a catch mechanism engaging in the tooth system. If the teeth of the tooth system are small, this is possible almost steplessly.

The retaining bracket can have at least one retaining element at its ends.

In an embodiment, the at least one fastening device is formed as a magnet, in particular wherein:

- the at least one fastening device can be fastened to the covering cap, in particular by adhesive bonding, screwing and/or clipping in, and/or
- the at least one fastening device can be installed on the main body magnetically, and/or
- the installation position of the at least one fastening device can be adjusted relative to the main body without tools.

The covering cap can be attached to the main body in a steplessly adjustable manner through the connection of the at least one magnetic fastening device.

The furniture fitting can have a centering aid for fitting the covering cap on the main body during the installation, preferably wherein the centering aid comprises a centering protrusion and a centering opening. Particularly preferably, the centering protrusion is arranged on the covering cap and/or the centering opening is arranged on the side surface of the main body, wherein the centering protrusion can be arranged in the centering opening. The centering aid substantially simplifies the installation of the covering cap on the main body.

A length scale is arranged on the furniture fitting, preferably on the main body or on the covering cap, wherein the position of the covering cap relative to the main body can be read by the length scale. For example, several furniture fittings can thus be adjusted equally by matching the values on the length scale.

The marks on the length scale can indicate the thickness of a second furniture board to which the installation position of the covering cap has to be adapted. The user can then easily set the correct installation position of the covering cap, for example, through the comparison with instructions for use.

In a preferred embodiment, the covering cap can be installed and disassembled without tools. The covering cap can thus be not only displaced without tools, but also removed and attached without tools.

The covering cap can be manufactured from plastic. Because of its light weight and low costs, plastic is a preferred material for the covering cap, particularly as the covering cap typically need not have a high stability.

The main body comprises an energy storage mechanism. With that, a torque can be applied to the furniture flap. In particular, in the case of flaps which open upwards, it is desirable that they are held at least in the opening position, preferably in all positions. The energy storage mechanism can in particular be formed mechanical, for example in the form of a spring.

The main body comprises an electric furniture drive. With an electric furniture drive, the furniture flap can be operated in a remote-controlled manner or by manual buttons. Integration into a home automation system is also made possible.

As energy storage mechanisms and electric furniture drives typically require a lot of space, the dimensions of the main body are substantial. It is therefore desirable to countersink the main body in a cutout of the furniture board.

According to the invention, the main body has two side surfaces, wherein the two side surfaces are shaped substantially identically and are parallel to each other. In particular, the furniture fitting is shaped at least partially, preferably substantially, symmetrical about the center plane between the two side surfaces. Symmetrical main bodies make it possible to install a covering cap on the left and/or right side and to fasten the main body to the furniture board from the left and from the right. Thus, only one type of main body has to be produced, which reduces the costs of production. The risk of confusion is eliminated for the installer.

The furniture fitting can comprise at least one attachment part, wherein the attachment part can be detachably fastened to the covering cap, preferably by plugging in, and wherein the attachment part can be printed on, and preferably has a logo printed on it. The individual printing on a cost-effective, exchangeable attachment part is thus effected.

A piece of furniture according to the invention comprises a furniture carcass and at least one above-described furniture fitting, wherein the furniture carcass has at least one first furniture board, wherein the main body is fastened to the at least one first furniture board.

The at least one first furniture board is preferably provided as a side wall of the furniture carcass.

In a preferred embodiment, the first furniture board has a, preferably milled, cutout, wherein the cutout is opened towards at least one front face and at least one side surface of the at least one first furniture board, and wherein the main body can be inserted into the cutout at least in areas. The main body thus does not take away any space in the furniture carcass. This embodiment is also to be preferred from an esthetic point of view.

The cutout is preferably shaped such that the main body can be inserted substantially completely into the first furniture board, wherein at least a part of the side surface of the main body remains accessible from the at least one side surface of the at least one first furniture board.

The accessibility of at least a part of the side surface allows, for example, adjustments to be made on the main body.

At least one side surface of the main body inserted in the cutout of the at least one first furniture board can be arranged substantially flush-mounted with at least one side surface of the first furniture board.

It is preferred that in the installed state the covering cap protrudes beyond the at least one side surface of the first furniture board. The covering cap can thus be gripped during disassembly.

The covering cap can be shaped such that the edge of the cutout in which the main body is arranged is concealed. The edge of the cutout thus does not fall within the field of view of the user and therefore need not be worked very cleanly or be otherwise machined.

Preferably, the furniture carcass has at least one second furniture board, which is preferably provided as a top panel of the furniture carcass.

In an embodiment, the at least one second furniture board is arranged with a front face on the at least one side surface of the at least one first furniture board. This embodiment comprises a typical right-angled connection between two furniture boards, for example a side wall and a top panel.

Preferably, the at least one second furniture board has an outside surface, which faces away from the main body, and a front face of the at least one first furniture board is arranged substantially flush-mounted with the outside surface of the at least one second furniture board. This embodiment comprises, for example, a typical right-angled and flush connection between two furniture boards.

In the installed state, the covering cap can butt against the at least one second furniture board.

In the installed state, the covering cap can be arranged at a distance from the at least one second furniture board, wherein the distance preferably measures less than 10 millimeters and particularly preferably less than 5 millimeters. For example, a shadow gap can thus be realized between the at least one second furniture board and the furniture fitting.

In an embodiment, the at least one second furniture board is arranged such that the at least one second furniture board at least partially conceals the main body inserted in the cutout of the at least one first furniture board. This can be the case, for example, when a thick top panel (second furniture board) is used the front face of which at least partially conceals the main body.

A method according to the invention for installing at least one above-described furniture fitting on at least one first furniture board is characterized by the following method:

- at least one first furniture board, preferably provided as a side wall of a furniture carcass, which has at least one cutout, is provided, wherein the cutout is opened towards at least one front face and at least one side surface of the at least one first furniture board,

- the main body of the at least one furniture fitting is inserted into the at least one first furniture board at least in areas, wherein at least a part of the side surface of the main body remains accessible from the at least one side surface of the at least one first furniture board,
- the covering cap is installed on the main body, wherein in the installed state the at least one side surface of the main body is at least partially covered,
- the installation position of the covering cap is adjusted relative to the main body, preferably without tools, preferably depending on a thickness and/or a position of at least one second furniture board, preferably provided as a top panel of the furniture carcass, which is or can be connected to the at least one first furniture board.

The installation position of the covering cap relative to the main body can therefore be adapted in the case of an already installed main body which is fixed in its position. The adaptation is effected depending on the thickness and/or position of at least one second furniture board.

As an example, a first piece of furniture and a second piece of furniture are presented, which have the same first furniture board, preferably a side wall, and have two second furniture boards, preferably top panels, which are different from each other. The second furniture boards can differ in terms of their thickness. The cutout in the first furniture board is identical in the case of both pieces of furniture, as it originates, for example, from a batch production. If it is desired that the covering cap in the case of both pieces of furniture butts against the second furniture board, an installation position of the covering caps relative to the main bodies that is different from each other must be set in the case of the two pieces of furniture.

BRIEF DESCRIPTION OF THE DRAWINGS

Further details and advantages of the invention are explained in more detail below by means of the description of the figures with reference to the drawings, in which.

DETAILED DESCRIPTION OF THE INVENTION

Figure 1:
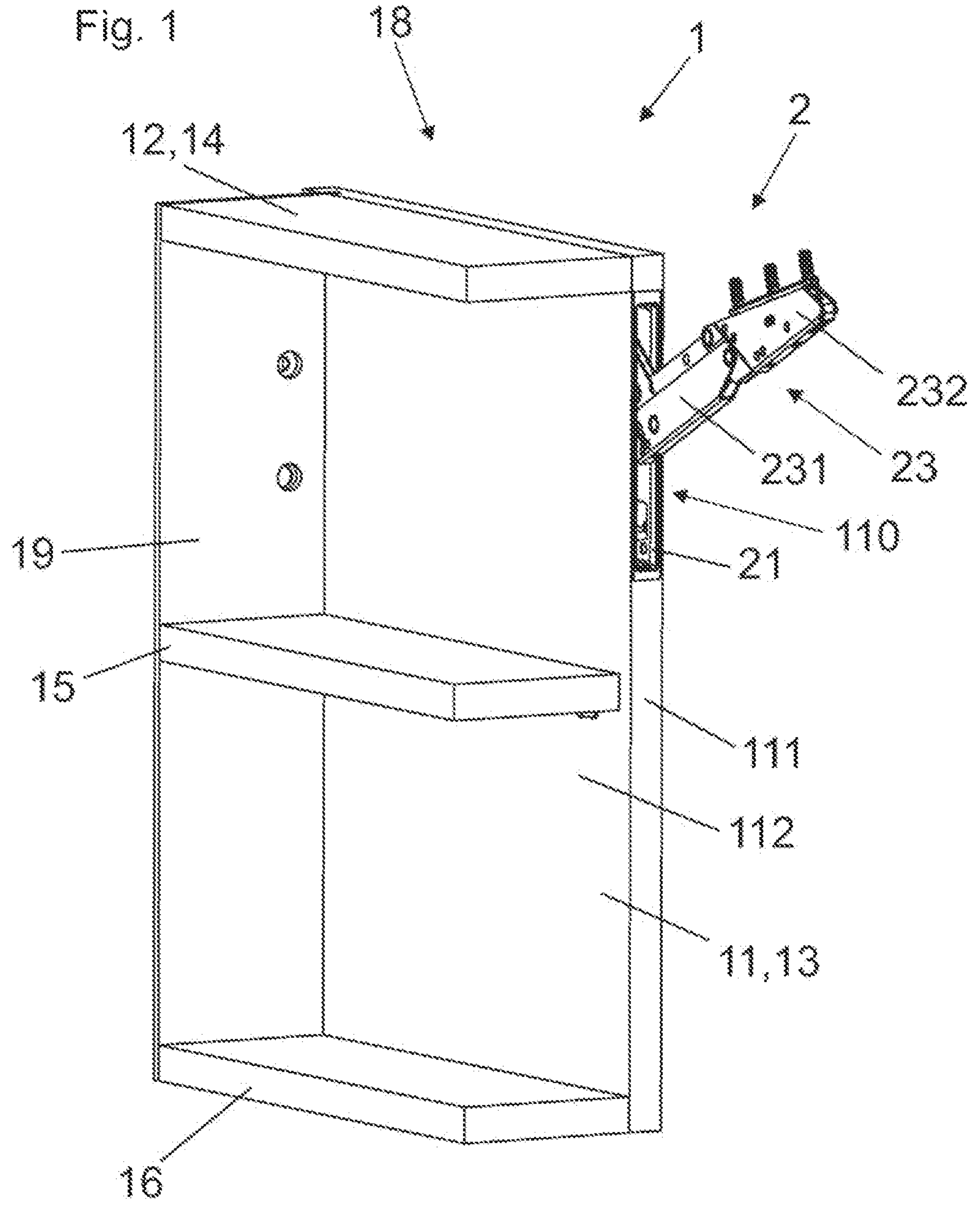
FIG. 1 is sectional representation of a piece of furniture with a cutout opened on the front face with inserted main body of a furniture fitting.

FIG. 1 shows a piece of furniture 1 according to the state of the art with a first furniture board 11, which is used as a side wall 13, and a second furniture board 12, which is used as a top panel 14. The piece of furniture 1 comprises further furniture boards such as an intermediate panel 15, a bottom panel 16 and a rear wall 19. These furniture boards form a furniture carcass 18. The typically present furniture flap 17 for closing the carcass is not shown.

Furthermore, a furniture fitting 2 is shown which has a main body 21. An actuating arm 23 is connected to the main body 21 in an articulated manner. The actuating arm 23 comprises at least one lever 231 and a flap fastening part 232, which are connected to each other in an articulated manner. A furniture flap 17 can be attached to the flap fastening part 232.

In FIG. 1 the main body 21 is inserted in a cutout 110 of the first furniture board 11. The main body 21 thus does not take away any space inside the furniture carcass 18. Moreover, the main body 21 is "hidden", which can have an esthetically appealing effect.

The cutout 110 is opened only to the front face 111 of the first furniture board 11. The side surfaces 212 of the main body 21 are thus not accessible in this embodiment.

The cutout 110 can be shaped as a milled portion.

Figure 2:
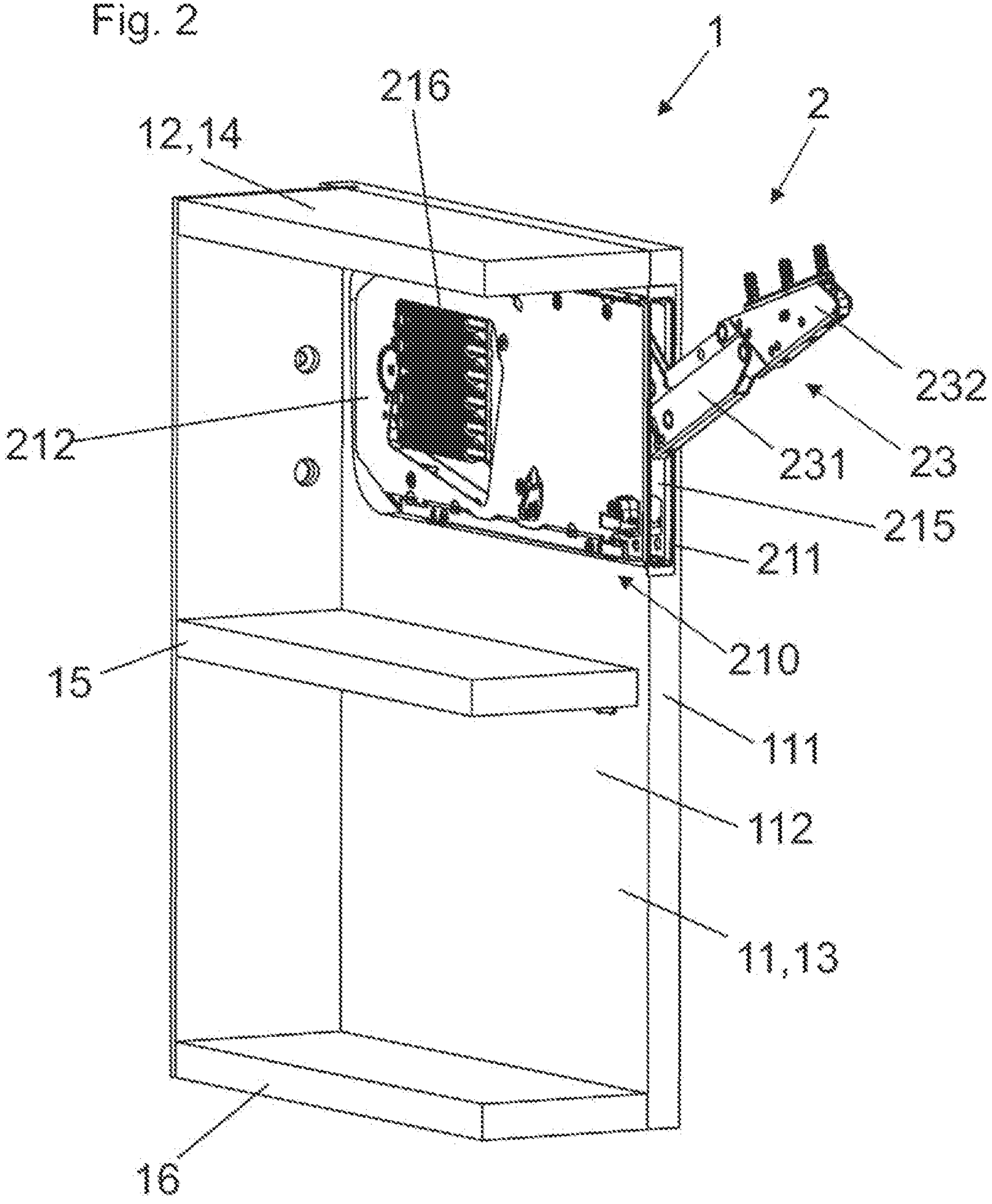
FIG. 2 is sectional representation of a piece of furniture with a cutout opened on the front face and on the side with inserted main body of a furniture fitting.

FIG. 2 shows an embodiment of a piece of furniture 1 according to the invention with a cutout 110 in the first furniture board 11, wherein the cutout 110 is opened towards at least one front face 111 and at least one side surface 112 of the at least one first furniture board 11.

The main body 21 is inserted into the cutout 110, wherein the cutout 110 is shaped such that the main body 21 is substantially completely countersunk into the first furniture board 11.

At least a part of the side surface 212 of the main body 21 is accessible from the at least one side surface 112 of the at least one first furniture board 11, unlike the embodiment in FIG. 1.

The visible side surface 212 of the main body 21 inserted in the cutout 110 of the at least one first furniture board 11 is arranged substantially flush-mounted with at least one side surface 112 of the first furniture board 11.

The main body 21 comprises an energy storage mechanism 216 in the form of several mechanical springs. Among other things, the main body 21 could also comprise an electric furniture drive.

The main body 21 has two side surfaces 212, wherein the two side surfaces 212 are shaped substantially identically and are parallel to each other. One side surface 212 is easily visible in FIG. 2. In addition, the furniture fitting 2 is shaped substantially symmetrical about the center plane between the two side surfaces 212. The furniture fitting 2 can thus be arranged on both sides of a furniture carcass 18.

As also in the state of the art, the furniture fitting 2 has at least one actuating arm 23 which can be connected to the furniture flap 17 and which can be pivoted relative to the main body 21 about an axis of rotation.

The main body 21 has a front face 211 with at least one opening 215, through which the at least one actuating arm 23 reaches in at least one open position.

Figure 3:
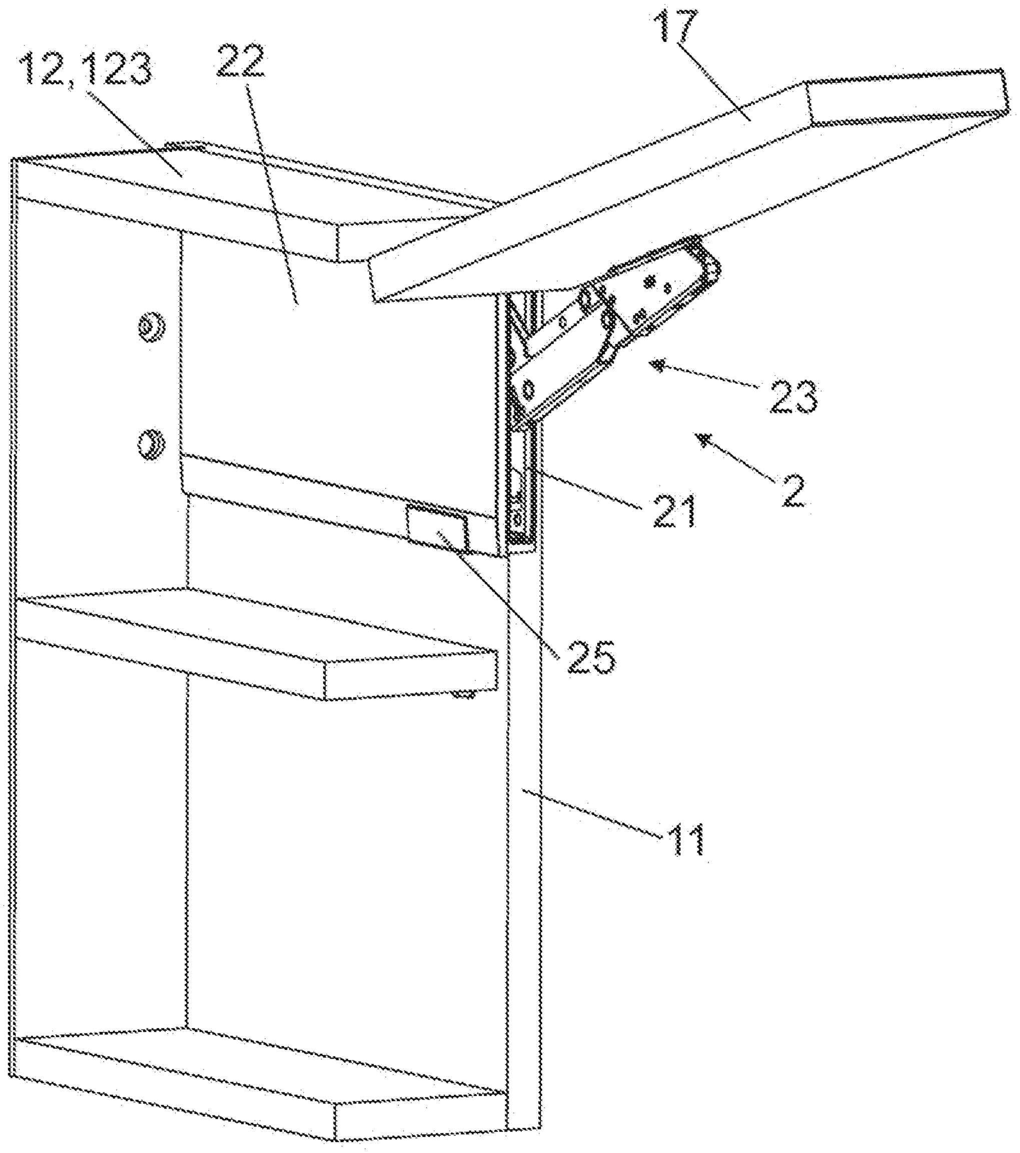
FIG. 3 is sectional representation of a piece of furniture with a main body and covering cap of a furniture fitting, FIGS. 4*a,b* show a piece of furniture with a top panel of small thickness and furniture fitting with a main body and covering cap, a. sectional representation, b. detail view, FIGS. 5*a,b* show a piece of furniture with a top panel of average thickness and furniture fitting with a main body and covering cap, a. sectional representation, b. detail view, FIGS. 6*a,b* show a piece of furniture with a top panel of large thickness and furniture fitting with a main body and covering cap, a. sectional representation, b. detail view, FIGS. 7*a,b* show a covering cap with a magnetic fastening device, a. perspective rear view, b. perspective front view, FIGS. 8*a,b* are exploded representations of a covering cap with a magnetic fastening device, a. perspective rear view, b. perspective front view, FIG. 9 show a main body and a covering cap with a magnetic fastening device.

FIG. 3 corresponds to FIG. 2, wherein here a covering cap 22 is installed on the main body 21, wherein in the installed state at least one side surface 212 of the main body 21 is covered. In addition, a furniture flap 17 is shown.

In the installed state the covering cap 22 protrudes beyond the at least one side surface 112 of the first furniture board 11. The edge of the cutout 110 is thus overlapped. In addition, the covering cap 22 can be easily gripped and thus can be easily installed and disassembled.

The installation position of the covering cap 22 relative to the main body 21 can preferably be adjusted without tools and steplessly.

The installation position of the covering cap 22 can be adjusted relative to the main body 21 at least in a direction substantially parallel to the front face 211 of the main body 21. The covering cap 22 is thus height-adjustable in the present embodiment.

The variation range of the installation position of the covering cap 22 relative to the main body 21 is at least 5 millimeters, preferably at least 10 millimeters.

The covering cap 22 can be not only adjustable without tools, but also able to be installed and disassembled without tools.

The covering cap 22 can be manufactured from plastic.

The furniture fitting 2 comprises at least one attachment part 25. The attachment part can be detachably fastened to the covering cap 22, preferably by plugging in. In addition, the attachment part 25 can be printed on, wherein it can, for example, have a logo printed on it.

Figure 4A:
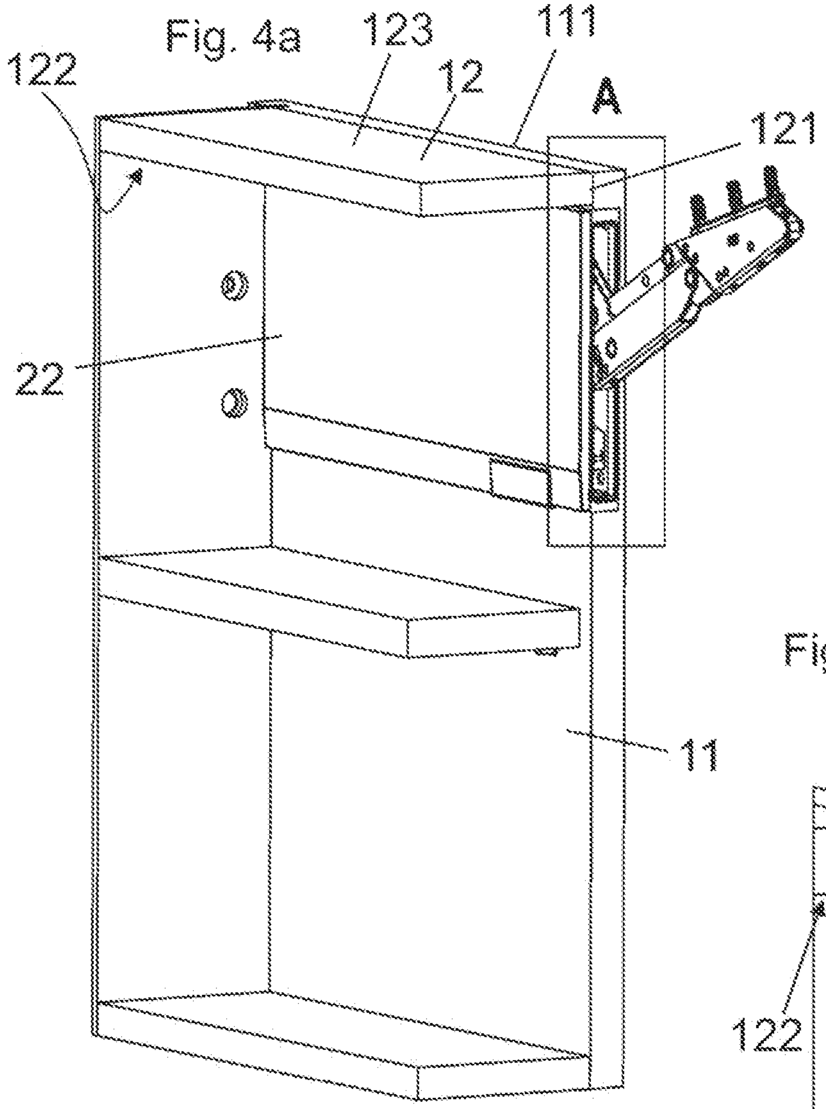
Figure 4B:
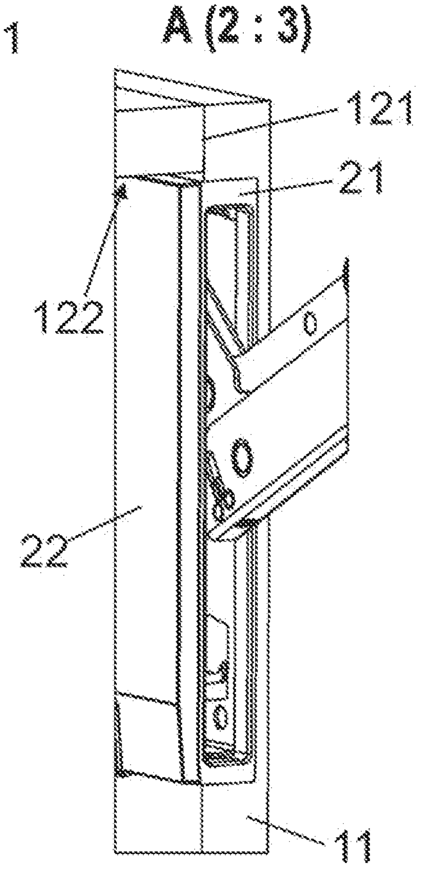

FIGS. 4*a,b*, 5*a,b* and 6*a,b* in each case show a main view (subfigures a) and a detail view (subfigures b) of a piece of furniture 1 with a furniture fitting 3 similar to FIG. 3.

However, the thickness of the second furniture board 12, which is provided as a top panel 14, varies between FIGS. 4*a,b*, 5*a,b* and 6*a,b*: FIGS. 4*a,b* show a second furniture board 12 of small thickness, FIGS. 5*a,b* show a second furniture board 12 of average thickness and FIGS. 6*a,b* show a second furniture board 12 of large thickness.

The designations "small thickness", "average thickness" and "large thickness" are to be understood here only relative to each other and not as absolute.

The second furniture board 12 is arranged with a front face 121 on the at least one side surface 112 of the at least one first furniture board 11. The second furniture board 12 is arranged substantially at a right angle to the first furniture board 11, as also in FIG. 3.

The second furniture board 12 has an outside surface 123, which faces away from the main body 21. The upper front face 111 of the first furniture board 11 is arranged substantially flush-mounted with the outside surface 123 of the at least one second furniture board 12.

Assuming this flush-mounting, the location of the inside surface 122 of the second furniture board 12 opposite the outside surface 123 varies for different thicknesses of the second furniture board 12. In other words: the height of the inside surface 122 of the second furniture board 12 varies in the case of FIGS. 4*a,b*, 5*a,b* and 6*a,b*.

In all of FIGS. 4*a,b*, 5*a,b* and 6*a,b*, in the installed state the covering cap 22 butts against the at least one second furniture board 12.

Alternatively, in the installed state the covering cap 22 could be arranged at a fixed distance from the at least one second furniture board 12, wherein the distance preferably measures less than millimeters and particularly preferably less than 5 millimeters. A shadow gap would thus be realized.

If the covering cap 22 is to butt against the second furniture board 12, the installation position of the covering cap 22 relative to the main body 21 inserted fixedly in the cutout 110 of the first furniture board 11 must be adapted to the location of the inside surface 122 of the second furniture board 12 and thus the thickness of the second furniture board 12.

This can be effected with the following steps:

- the covering cap 22 is installed on the main body 21, wherein in the installed state the at least one side surface 212 of the main body 21 is at least partially covered,
- the installation position of the covering cap 22 is adjusted relative to the main body 21, preferably without tools, preferably depending on a thickness of a second furniture board 12, preferably provided as a top panel 14 of the furniture carcass 18, which is or can be connected to the at least one first furniture board 11.

Figure 5A:
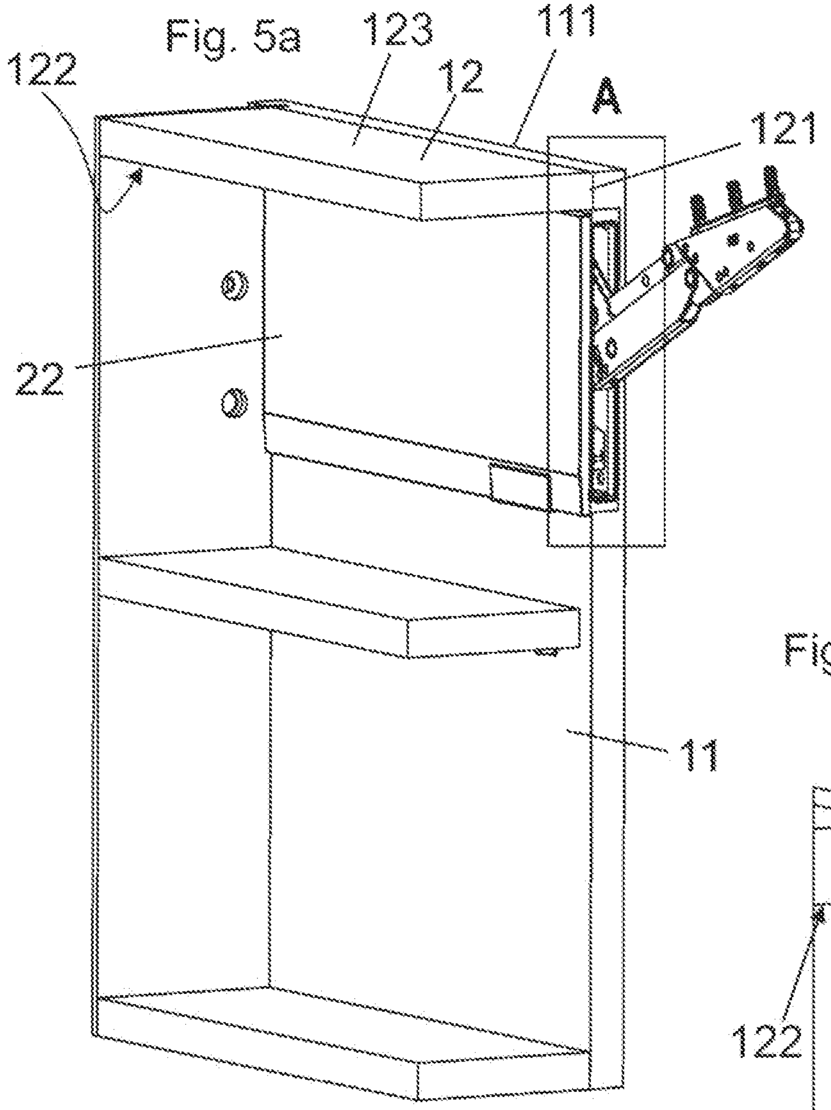
Figure 5B:
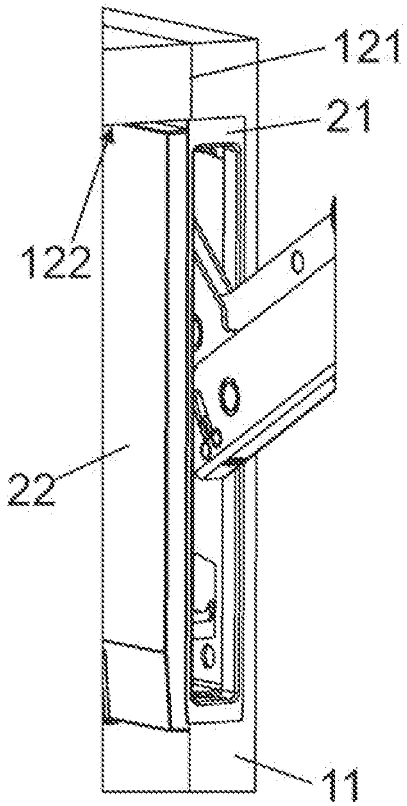

The covering cap 22 in FIGS. 4*a,b* is therefore installed higher than the covering cap 22 in FIGS. 5*a,b*. The covering cap 22 in FIGS. 5*a,b* is in turn installed higher than the covering cap 22 in FIGS. 6*a,b*.

Figure 6A:
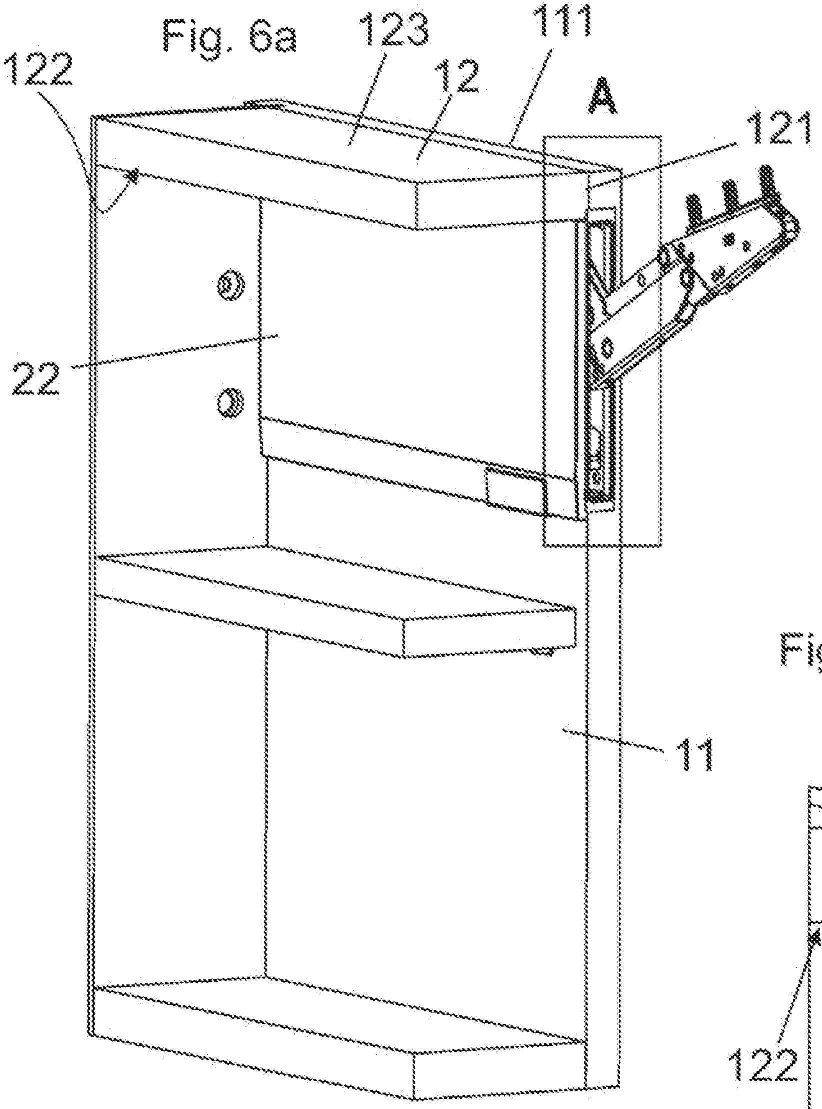
Figure 6B:
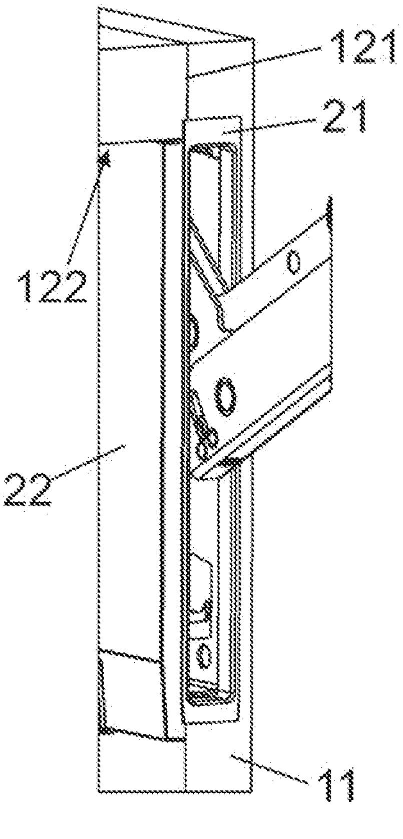

In FIGS. 6*a,b*, the at least one second furniture board 12 is arranged such that the second furniture board 12 at least partially conceals the main body 21 countersunk in the cutout 110 of the first furniture board 11.

A length scale can be arranged on the main body 21 or on the covering cap 22, wherein the position of the covering cap 22 relative to the main body 21 can be read by means of the length scale. The installation position of the covering cap 22 relative to the main body 21 can thus be read. The installation of several furniture fittings 2 can then be carried out identically more easily. For example, a mark specific to the thickness of the second furniture board 12 can be provided.

Figure 7A:
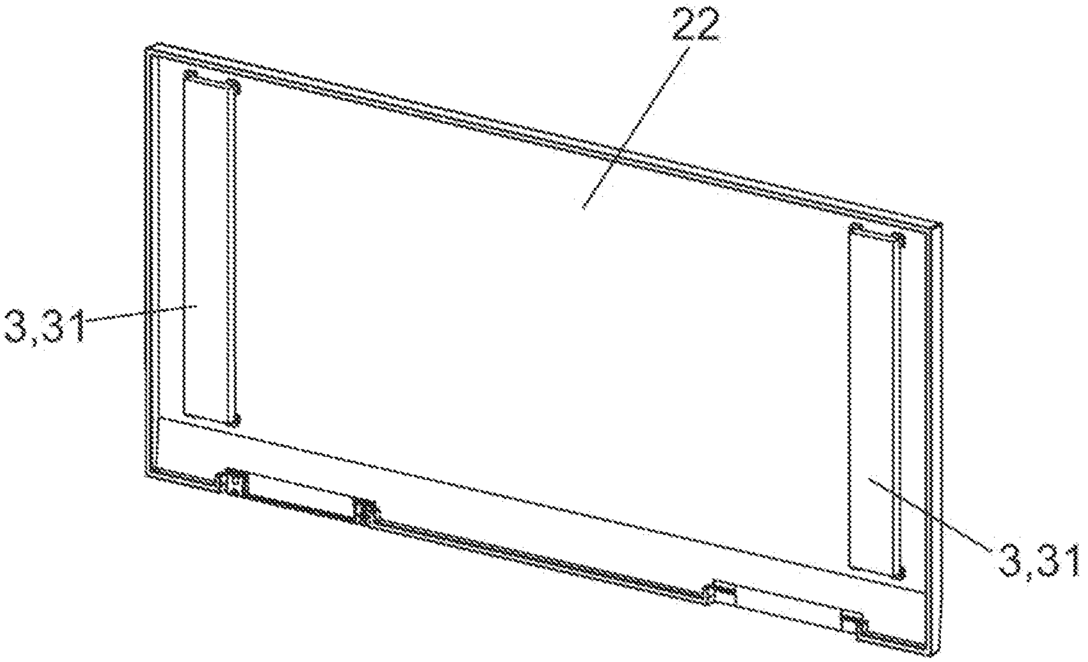
Figure 7B:
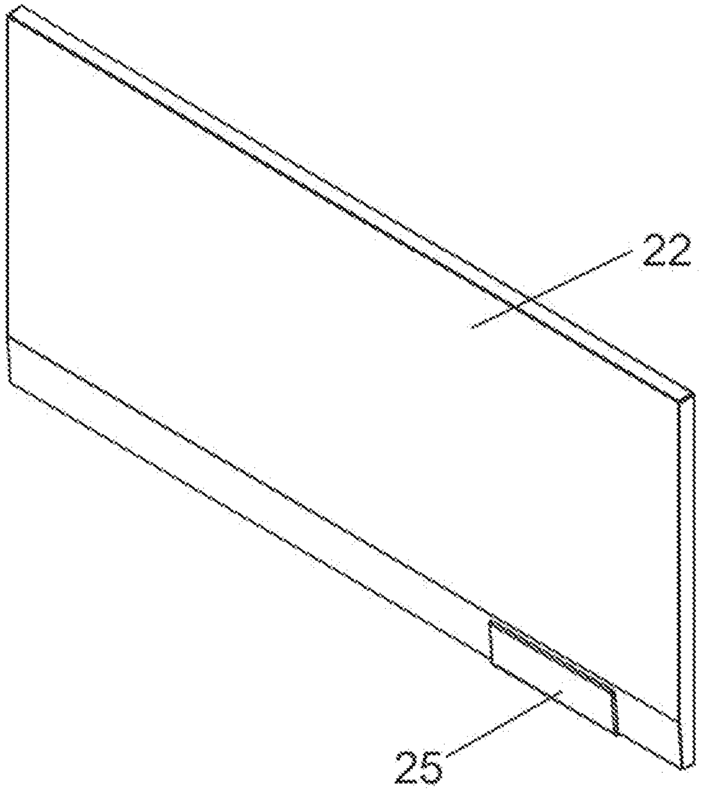
Figure 8A:
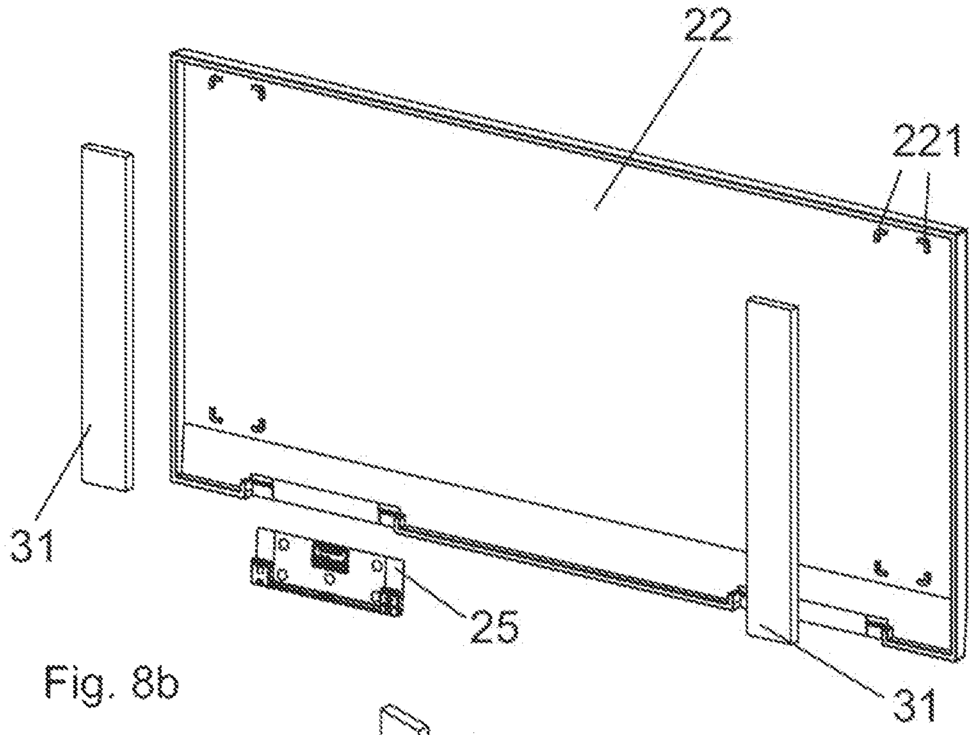
Figure 8B:
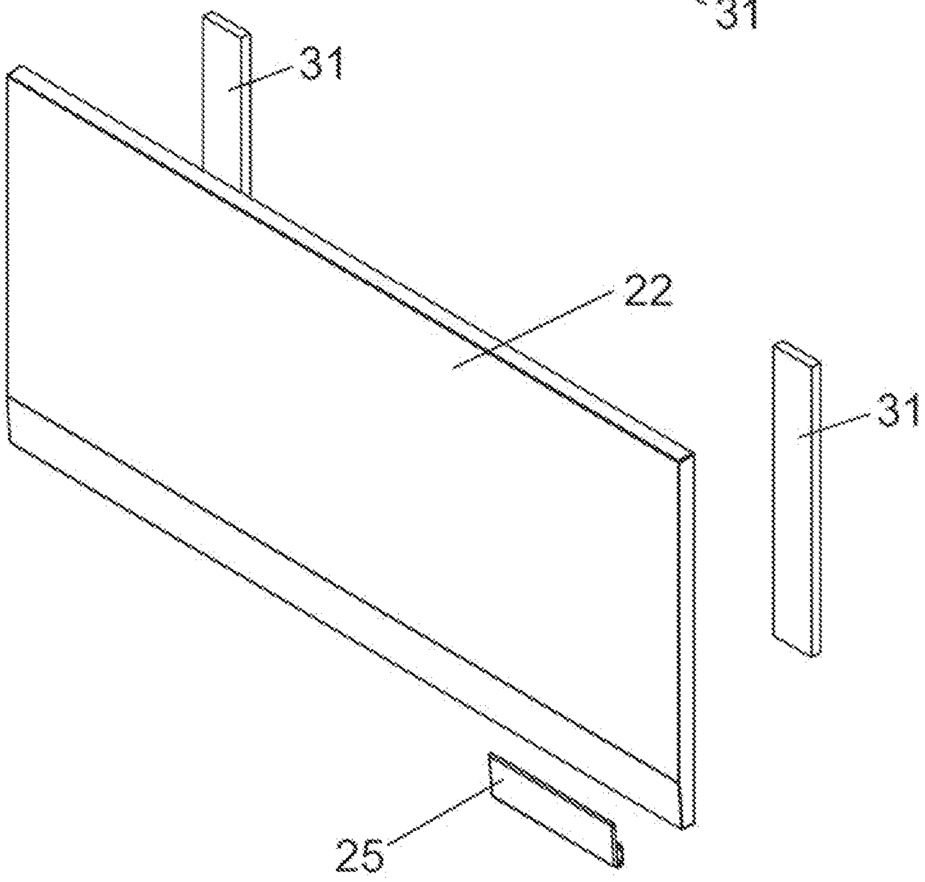
Figure 9:
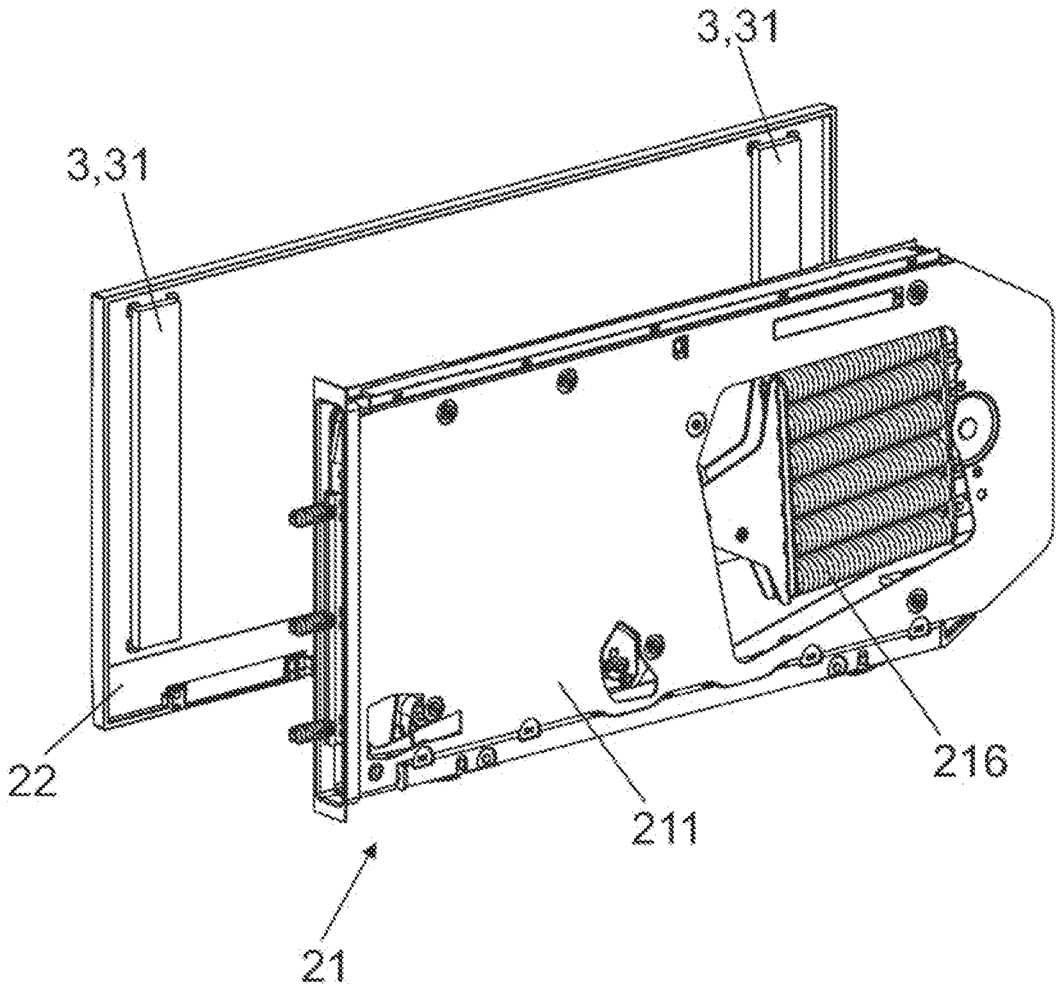

FIGS. 7*a,b* to 15*a,b* in each case show at least one fastening device 3, wherein the covering cap 22 can be fastened to the main body 21 with the at least one fastening device 3.

In particular, the at least one fastening device 3 can be fastenable to the main body 21 and/or to the covering cap 22.

The covering cap 22 can be fastened, preferably detachably, to the at least one side surface 212 of the main body 21, preferably exclusively, by means of the at least one fastening device 3.

FIGS. 7*a,b*, 8*a,b* and 9 show an embodiment of the fastening device 3 as a magnet 31, wherein two magnets 31 are provided here.

In the embodiment shown here, the fastening of the magnets 31 to the covering cap 22 is effected by clipping into four bars 221 per magnet 31 without tools. The bars 221 form right angles here.

However, the magnets 31 can also be fastenable by adhesive bonding or screwing.

The magnets 31 can adhere to any point on the main body 21, the side surfaces 212 of which are formed of a magnetic material, preferably metal.

The installation position of the magnets 31 can thus be adjusted relative to the main body 21 without tools and steplessly.

Figure 10:
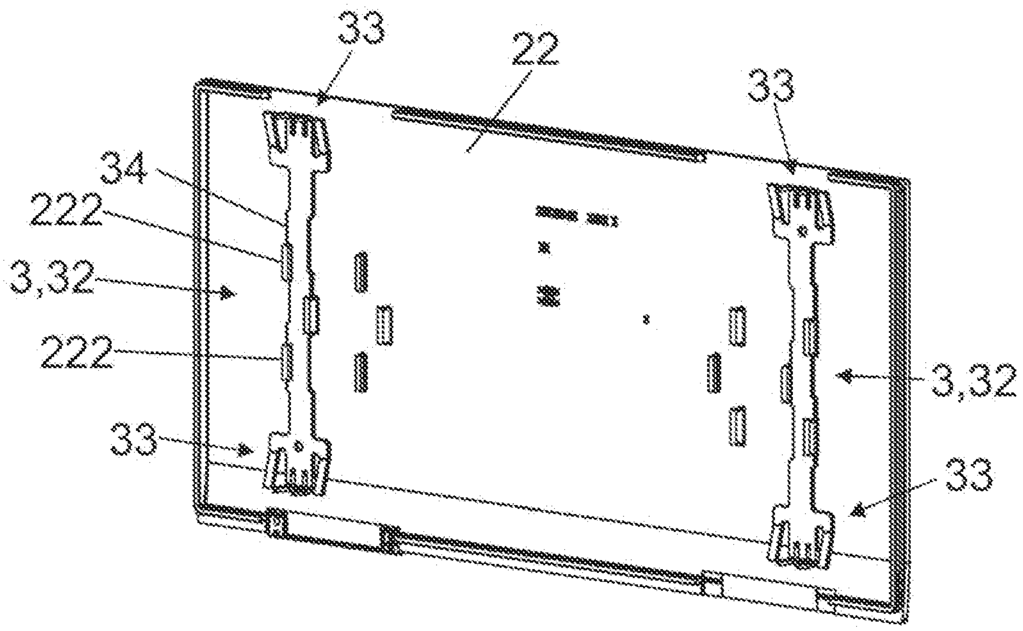
FIG. 10 shows a covering cap with a fastening device with a retaining bracket, FIGS. 11*a,b* show a covering cap with a fastening device with a retaining bracket, "covering cap top" setting, a. perspective rear view, b. detail view, FIGS. 12*a,b* show a covering cap with a fastening device with a retaining bracket, "covering cap middle" setting, a. perspective rear view, b. detail view, FIGS. 13*a,b* show a covering cap with a fastening device with a retaining bracket, "covering cap bottom" setting, a. perspective rear view, b. detail view, FIGS. 14*a,b* show fastening of the retaining bracket to the main body: fastened state, a. detail view, b. perspective rear view, FIGS. 15*a,b* show fastening of the retaining bracket to the main body: detached state, a. detail view, b. perspective rear view, FIGS. 16*a,b* show a furniture fitting with a. covering cap not yet installed, b. covering cap installed, FIGS. 17*a,b* show a covering cap with a centering device, a. perspective view, b. detail view.
Figure 11A:
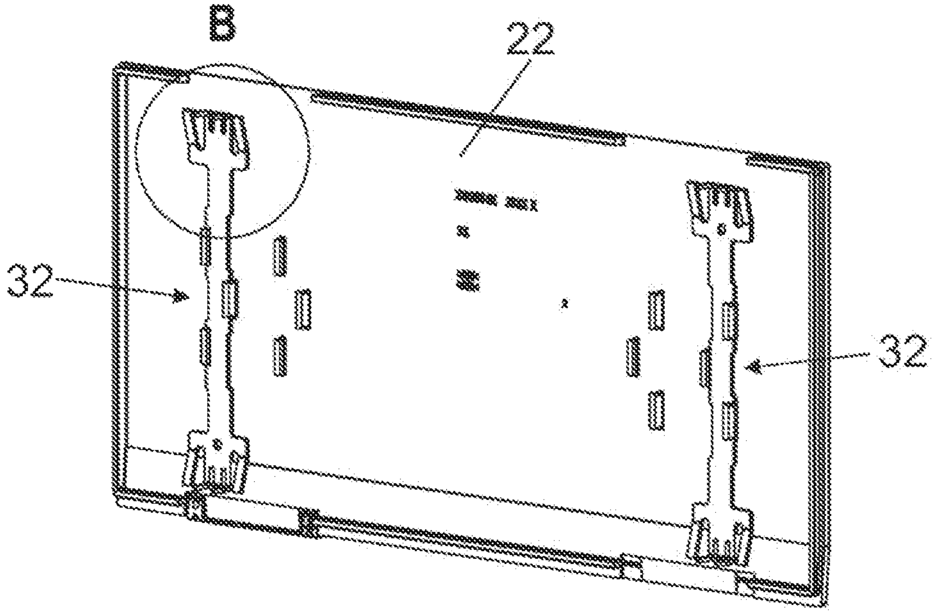
Figure 11B:
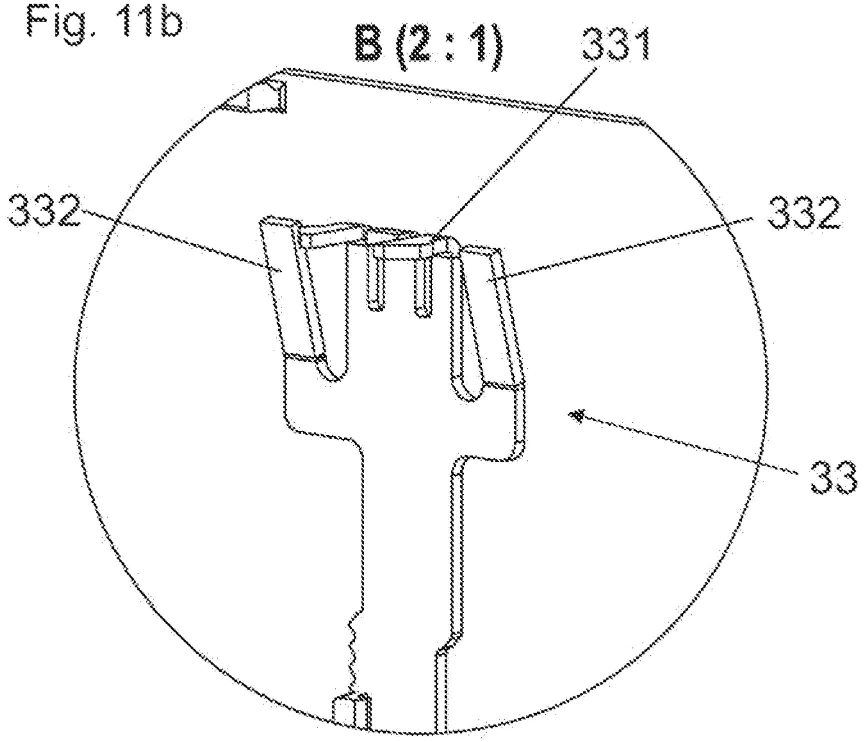
Figure 12A:
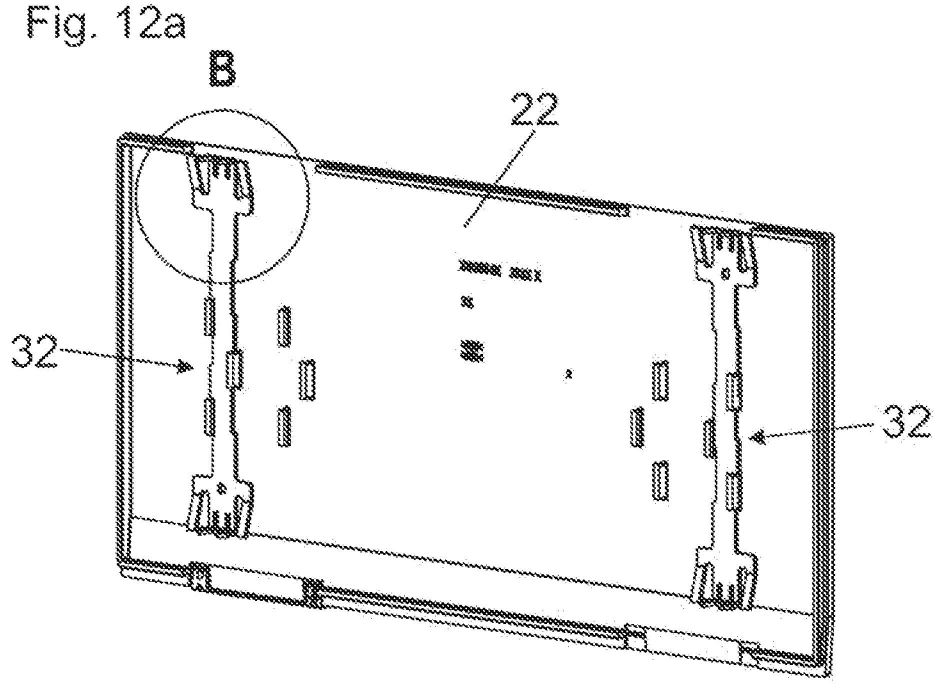
Figure 12B:
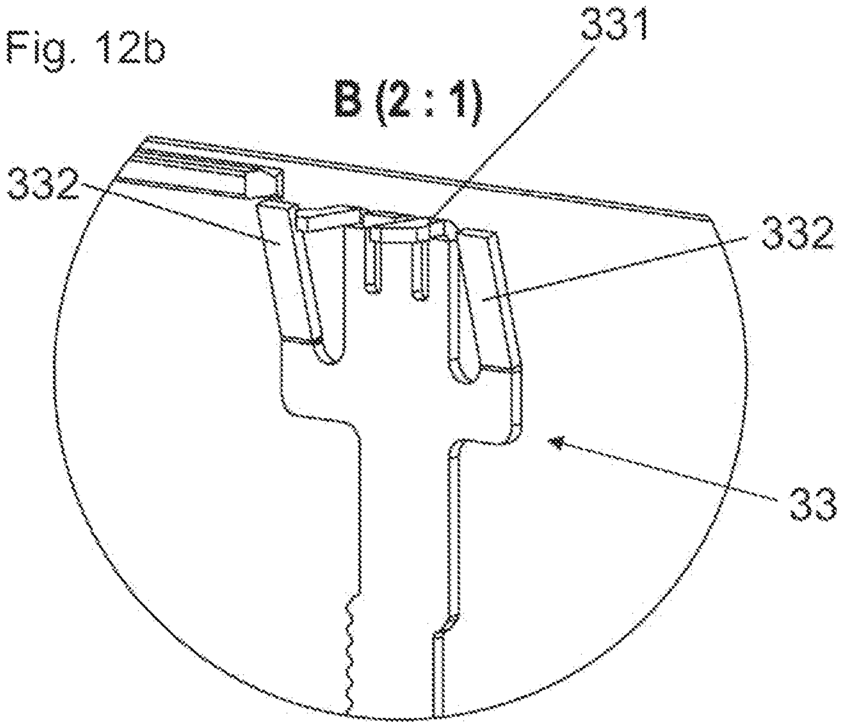
Figure 13A:
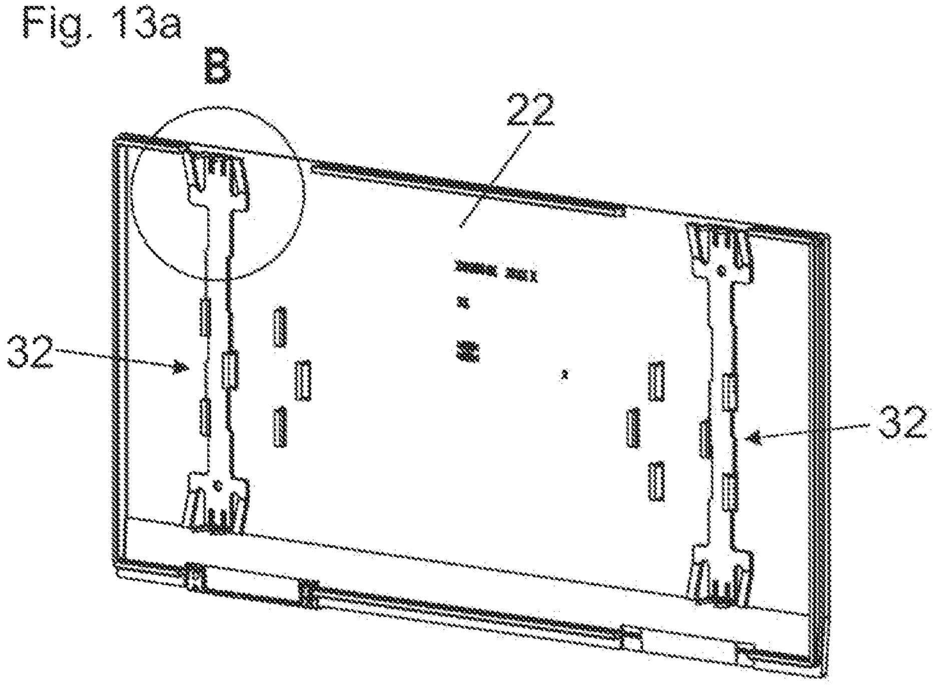
Figure 13B:
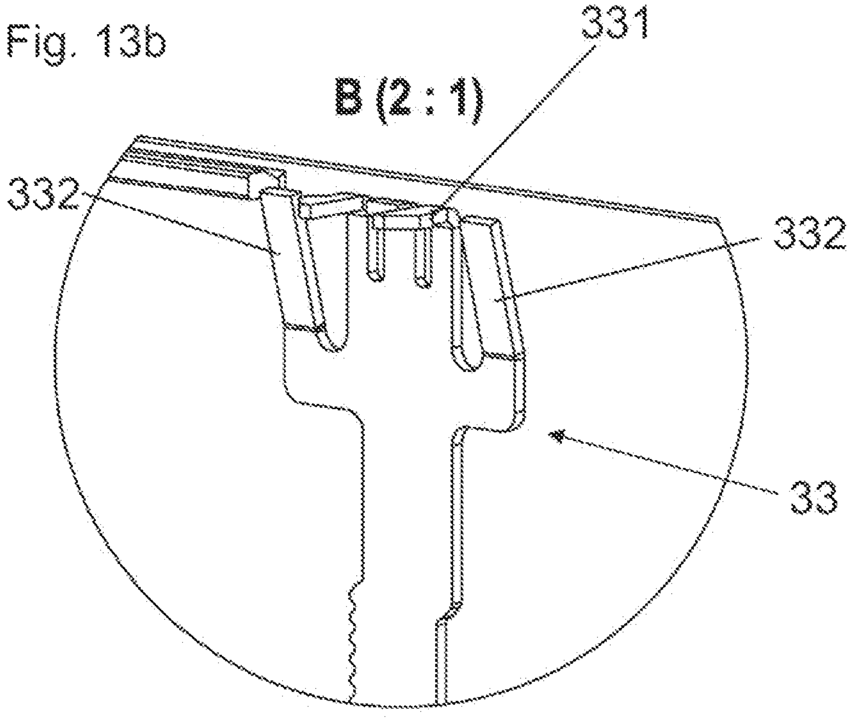
Figure 14A:
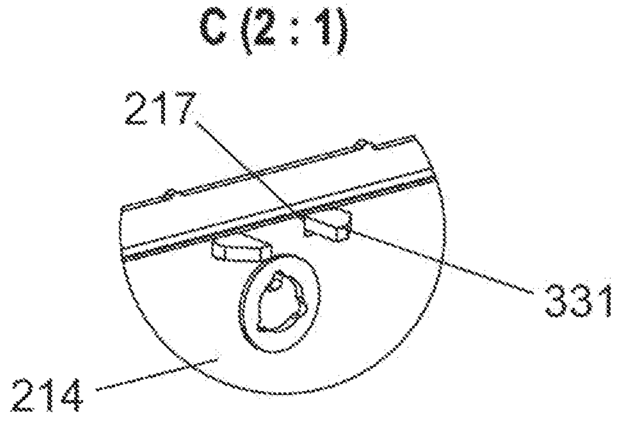
Figure 14B:
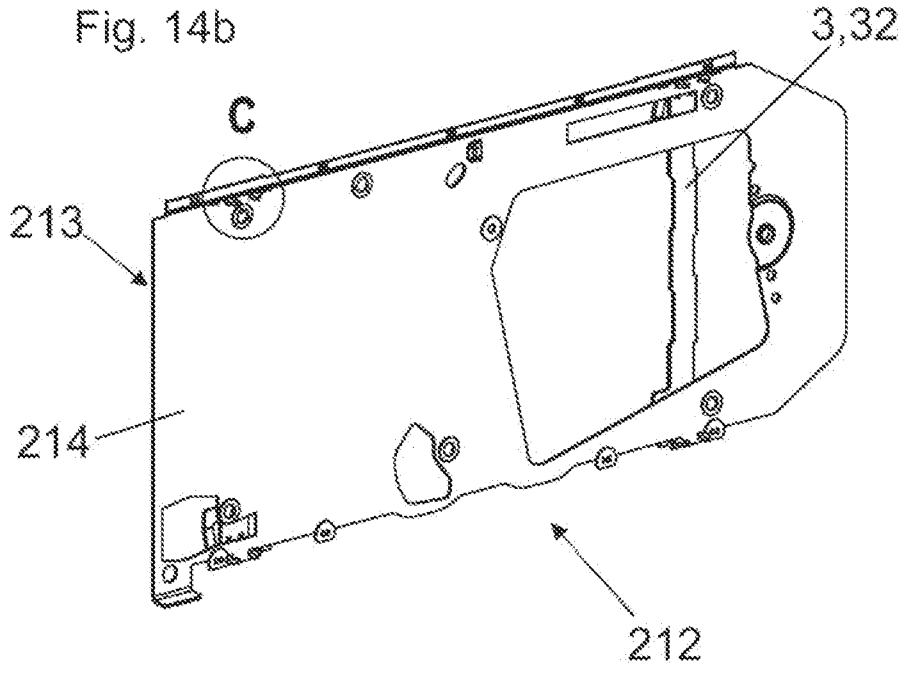
Figure 15A:
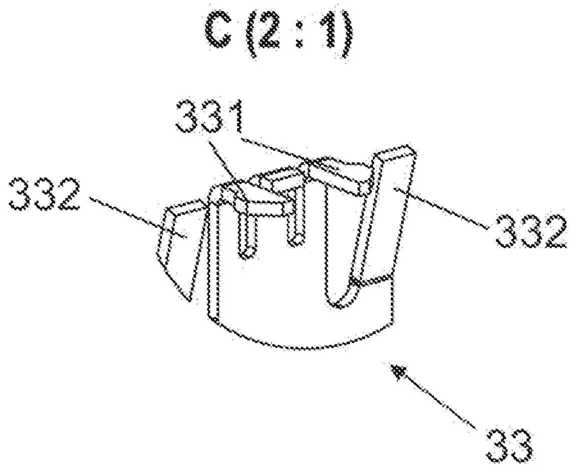
Figure 15B:
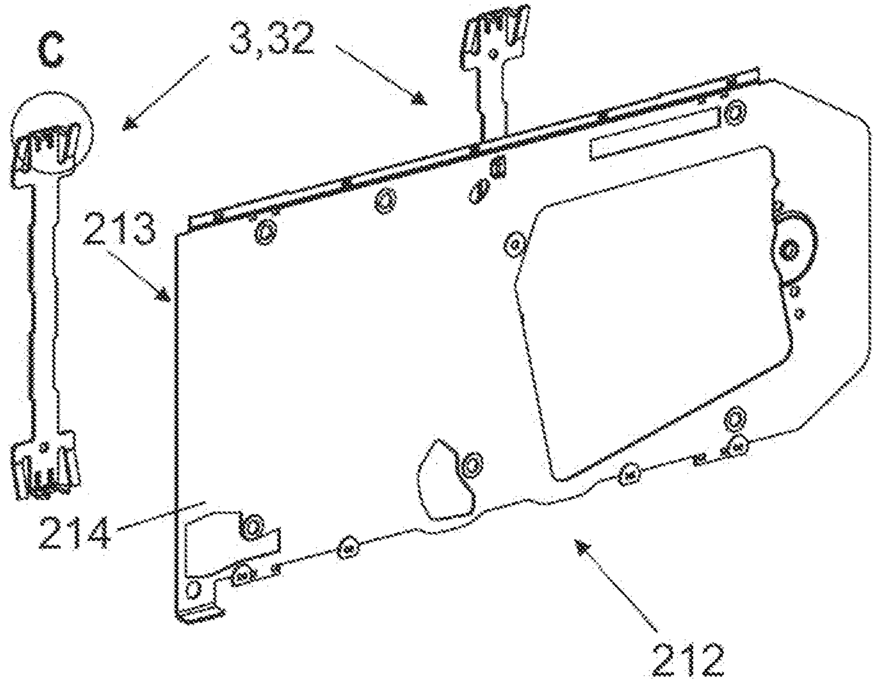

FIGS. 10, 11*a,b*, 12*a,b*, 13*a,b* and 14*a,b* show an embodiment of the fastening device 3 with a retaining element 33.

The fastening by means of a retaining element 33 to the main body 21 can be effected as follows:

The at least one side surface 212 of the main body 21 has at least one opening 217. The at least one fastening device 3 has at least one retaining element 33, preferably formed resilient, which can be introduced into the at least one opening 217 of the at least one side surface 212.

At least one catch means 331, which can be applied to a rear side 213 of the side surface 212 which is opposite a front side facing the covering cap 22, is arranged on the at least one retaining element 33.

A spring element 332 in the form of an elastic finger is formed on the at least one retaining element 33.

The at least one fastening device 3 can thus be installed on the main body 21 without tools.

The fastening device 3 in FIGS. 10, 11*a,b*, 12*a,b*, 13*a,b* and 14*a,b* is shaped as a retaining bracket 32. The one retaining element 33 is arranged at the respective ends of the retaining bracket 32 for fastening to the main body 21.

The retaining bracket 32 has a tooth system 34 in its central part. In the installed state of the retaining bracket 32 this tooth system 34 engages in an opposite catch mechanism 222 on the covering cap 22. The retaining bracket 32 is thus linearly displaceable relative to the covering cap 22 without the use of a tool.

Figure 16A:
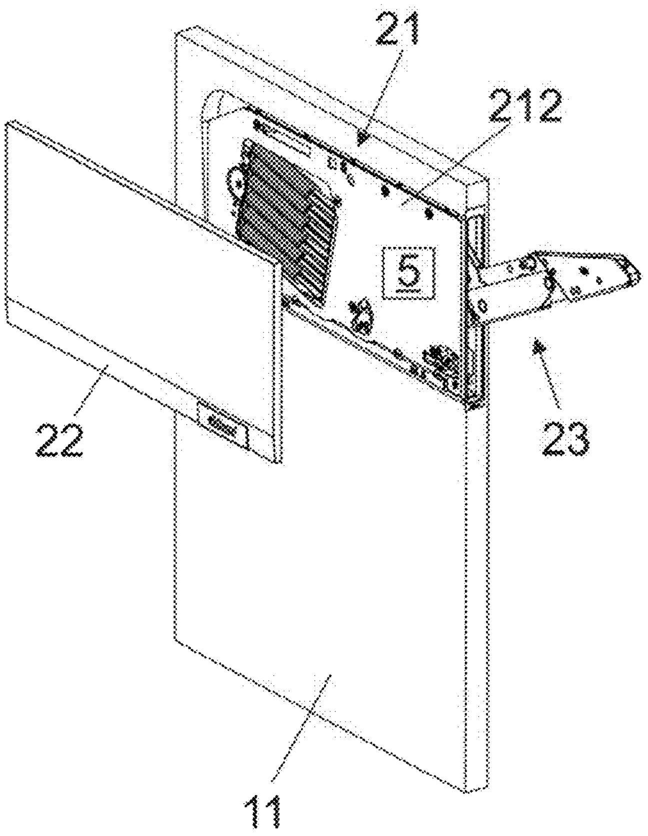
Figure 16B:
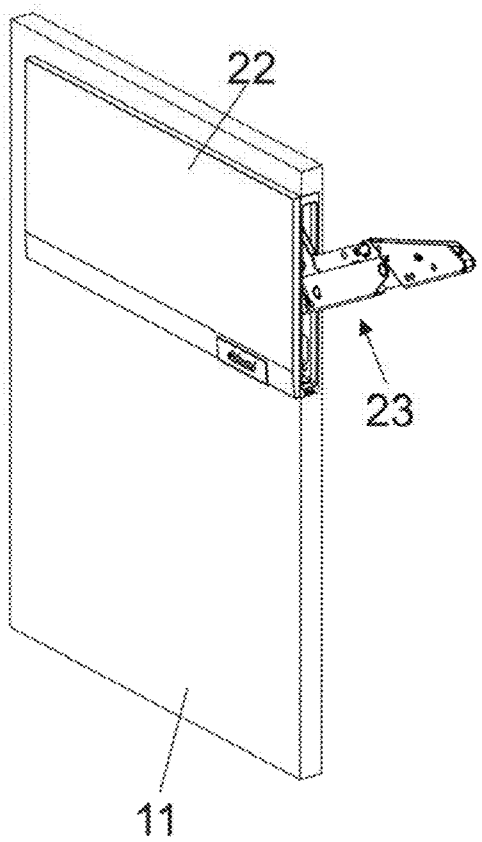

FIGS. 16*a,b* show two steps in the installation of the covering cap 22 on the main body 21. The covering cap 22 is not yet installed in FIG. 16*a*, while in FIG. 16*b* the covering cap 22 is already arranged on the main body 21.

During the installation of the covering cap 22 on the main body 21 it is important that the covering cap 22 is arranged centered in a direction transverse to the displacement direction, typically in a horizontal direction.

Particularly in the case of the installation of the covering cap 22 by means of magnets 31, a centered arrangement is difficult to bring about, as the magnets 31 can adhere to any point on the side wall 212 of the main body 21.

In order to simplify the centered arrangement, a centering aid 4 can be provided for fitting the covering cap 22 on the main body 21 during the installation.

Figure 17A:
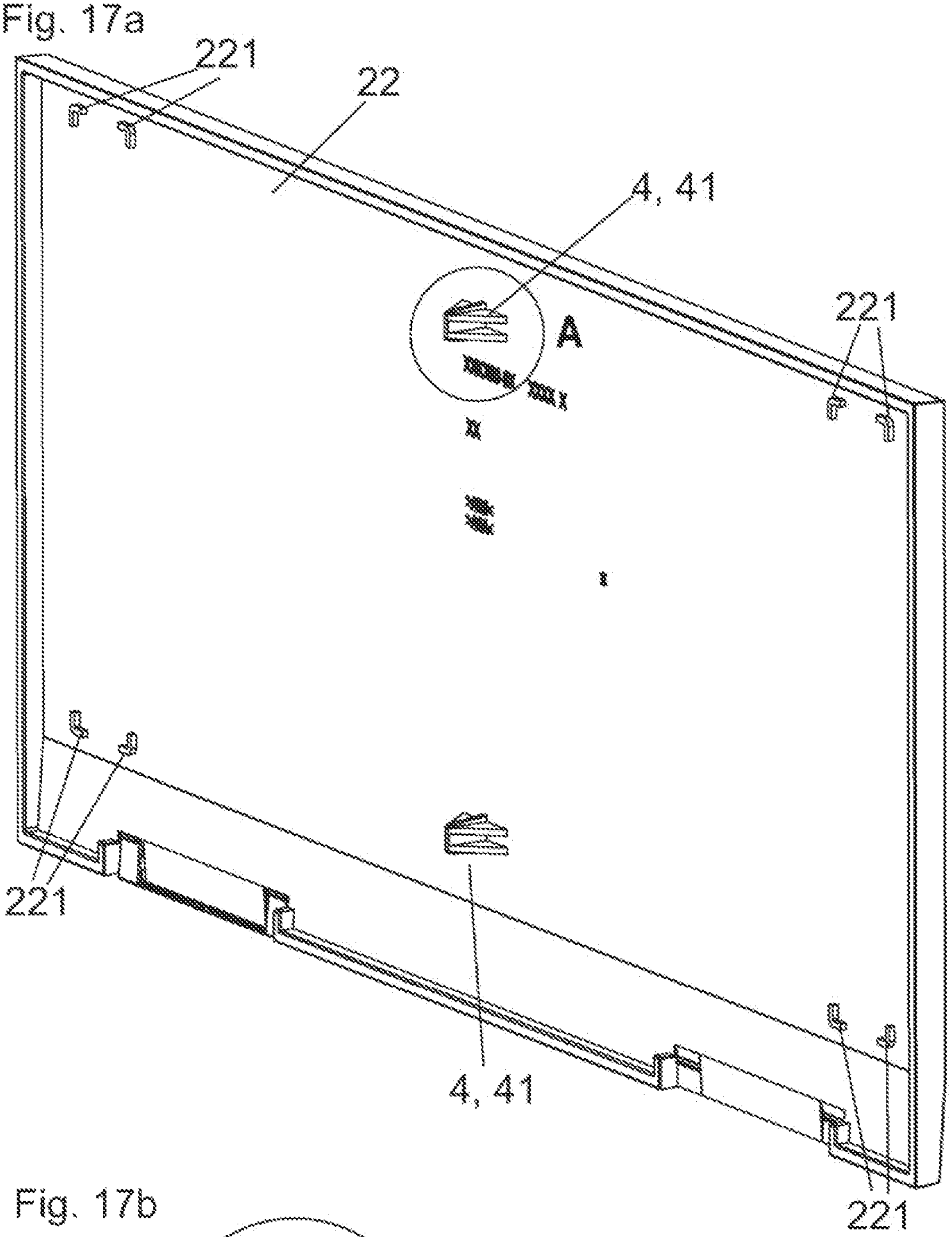
Figure 17B:
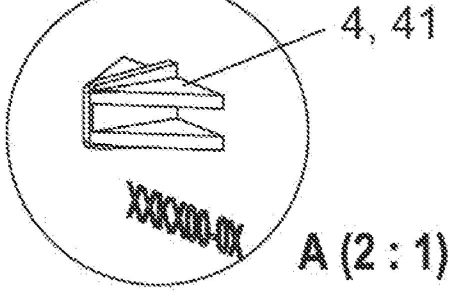

An embodiment of the centering aid 4 is shown in FIGS. 17*a,b*. Here, the centering aid 4 is shaped as a centering protrusion 41 arranged on the covering cap 22. Here, FIG. 17*a* shows the covering cap 22 and FIG. 17*b* shows a detail representation of the centering protrusion 41. The bars 221 are likewise arranged on the covering cap 22 for installing the magnets 31.

Figure 18A:
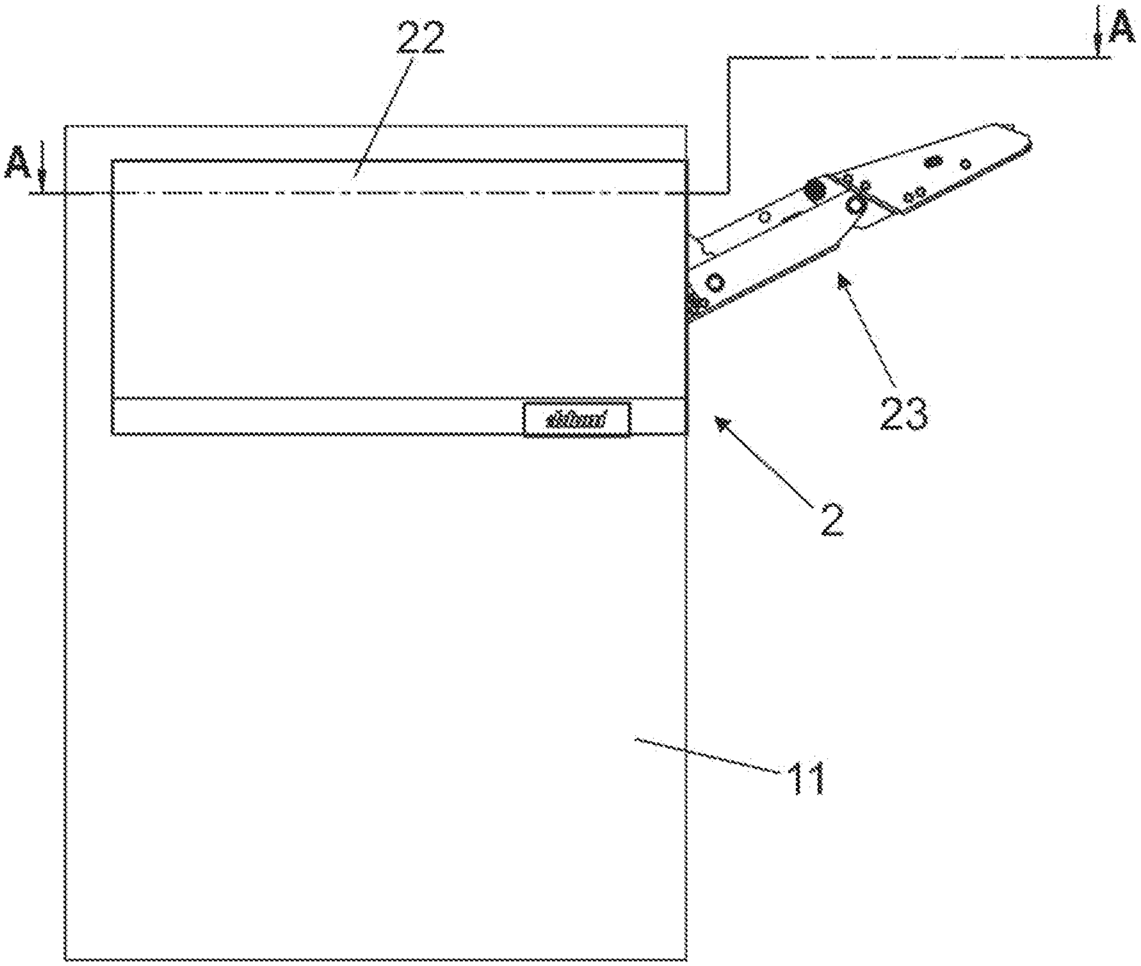
FIGS. 18*a-c* show an installed furniture fitting with a centering aid, a. side view, b. sectional representation, c. detail view of the centering aid.
Figure 18B:
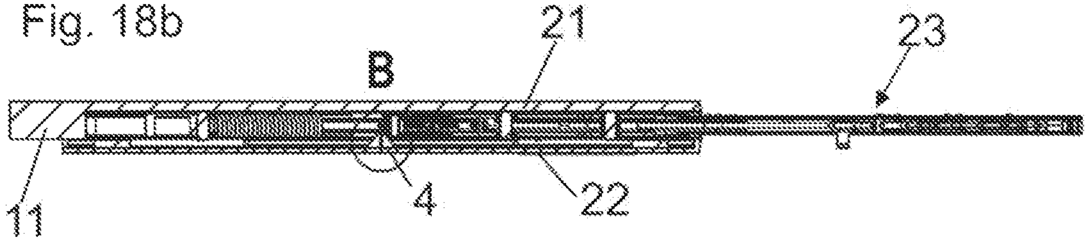
Figure 18C:
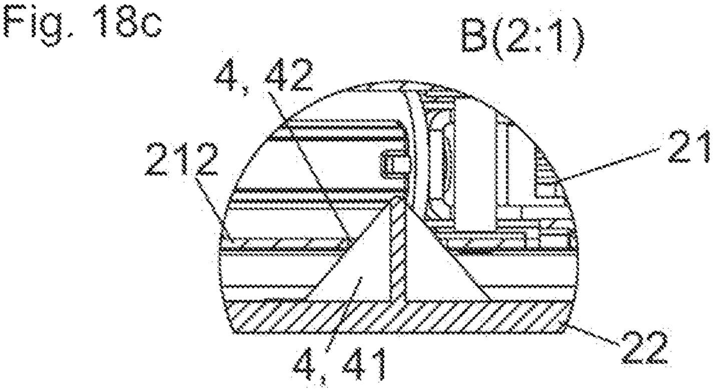

FIGS. 18*a-c* show a furniture fitting 2 installed in a first furniture board 11, wherein here too the covering cap 22 is already installed on the main body 21. The furniture fitting 2 has a centering device 4, which comprises a centering protrusion 41 on the covering cap 22 as in FIGS. 17*a,b* and a centering opening 42 in the side surface 212 of the main body 21.

FIG. 18*a* shows a side view of the furniture fitting 2 arranged in a cutout 110 in the first furniture board 11. FIG. 18*b* shows a sectional representation of FIG. 18*a* through the centering device 4.

FIG. 18*c* shows an enlarged representation of the sectional representation in FIG. 18*b*. The centering protrusion 41, which is arranged in the centering opening 42, an opening in the side wall 212 of the main body, is easily visible here. The covering cap 22 is thus arranged centered on the main body 21.

In order to achieve the displaceability of the covering cap 42 in one direction, the centering opening 42 is formed as a vertical slit. Thus, the covering cap 22 can be displaced with respect to the main body 21 in a vertical direction, while a movement in a horizontal direction is blocked by the centering device 4.

LIST OF REFERENCE NUMBERS

- 1 piece of furniture
  - 10 furniture board
  - 11 first furniture board
    - 110 cutout
    - 111 front face of the first furniture board
    - 112 side surface of the first furniture board
  - 12 second furniture board
    - 121 front face of the second furniture board
    - 122 inside surface of the second furniture board
    - 123 outside surface of the second furniture board
  - 13 side wall
  - 14 top panel
  - intermediate panel
  - 16 bottom panel
  - 17 furniture flap
  - 18 furniture carcass
- 2 furniture fitting
  - 21 main body
    - 211 front face of the main body
    - 212 side surface of the main body
    - 213 front side of the side surface
    - 214 rear side of the side surface
    - 215 front-face opening
    - 216 energy storage mechanism
    - 217 opening for retaining element
  - 22 covering cap
    - 221 bar
    - 222 bar with catch mechanism
  - 23 actuating arm
    - 231 lever
    - 232 flap fastening part
  - 25 attachment part
- 3 fastening device
  - 31 magnet
  - 32 retaining bracket
  - 33 retaining element
    - 331 catch means
    - 332 spring means
  - 34 tooth system on the fastening device
- 4 centering device
  - 41 centering protrusion
  - 42 centering opening

The invention claimed is:

1. A furniture fitting for movably mounting a furniture flap on a furniture carcass, comprising:
- a main body having two side surfaces which are shaped substantially identically and are parallel to each other;
- a covering cap, wherein the main body is configured to be at least partially inserted in a furniture board of the furniture carcass, wherein the covering cap is configured to be installed on the main body so as to at least partially cover at least one of the side surfaces of the main body, and wherein an installation position of the covering cap is adjustable relative to the main body;
- a fastening device, wherein the covering cap is configured to be fastened to the main body with the fastening device, wherein the fastening device is formed as a magnet; and
- a centering aid for fitting the covering cap on the main body during installation, wherein the fastening device and the centering device are two separate components.

2. The furniture fitting according to claim 1, wherein the installation position of the covering cap can be steplessly adjusted relative to the main body.

3. The furniture fitting according to claim 1, further comprising at least one actuating arm which is configured to be connected to the furniture flap and which is pivotable relative to the main body about an axis of rotation.

4. The furniture fitting according to claim 3, wherein the main body has a front face with at least one opening, through which the at least one actuating arm reaches in at least one open position, wherein the installation position of the covering cap can be adjusted relative to the main body at least in a direction substantially parallel to the front face of the main body.

5. The furniture fitting according to claim 1, wherein a variation range of the installation position of the covering cap relative to the main body is at least 5 millimeters.

6. The furniture fitting according to claim 1, wherein
- the fastening device is configured to be installed on the main body without tools, or
- the fastening device is configured to be installed on the covering cap without tools, or
- an installation position of the fastening device is adjustable relative to the main body without tools, or
- the installation position of the fastening device is adjustable relative to the covering cap without tools.

7. The furniture fitting according to claim 1, wherein the covering cap is configured to be fastened to the at least one of the side surfaces of the main body by the fastening device.

8. The furniture fitting according to claim 1, wherein the at least one of the side surfaces of the main body has at least one opening and the fastening device has at least one retaining element which can be introduced into the at least one opening of the at least one of the side surfaces.

9. The furniture fitting according to claim 1, wherein the fastening device is formed as at least one retaining bracket.

10. The furniture fitting according to claim 1, wherein a length scale is arranged on the furniture fitting, and wherein a position of the covering cap relative to the main body can be read via the length scale.

11. The furniture fitting according to claim 1, wherein the covering cap is configured to be installed on the main body and disassembled from the main body without tools.

12. The furniture fitting according to claim 1, wherein the covering cap is manufactured from plastic.

13. The furniture fitting according to claim 1, wherein the main body comprises an energy storage mechanism or an electric furniture drive.

14. The furniture fitting according to claim 1,
wherein the furniture fitting is shaped at least partially symmetrical about a center plane between the two side surfaces.

15. The furniture fitting according to claim 1, further comprising an attachment part, wherein the attachment part is configured to be detachably fastened to the covering cap, and wherein the attachment part is configured to be printed on.

16. A piece of furniture comprising a furniture carcass and the furniture fitting according to claim 1, wherein the furniture carcass has a first furniture board, wherein the main body is fastened to the first furniture board.

17. The piece of furniture according to claim 16, wherein the first furniture board has a cutout, wherein the cutout is opened towards a front face and a side surface of the first furniture board, and wherein the main body is configured to be inserted at least partially into the cutout.

18. The piece of furniture according to claim 17, wherein at least one side surface of the main body inserted in the cutout of the first furniture board is arranged substantially flush-mounted with the side surface of the first furniture board.

19. The piece of furniture according to claim 16, wherein the furniture carcass has a second furniture board.

20. The piece of furniture according to claim 19, wherein the second furniture board is arranged with a front face on the side surface of the first furniture board.

21. The piece of furniture according to claim 19, wherein:
in an installed state the covering cap butts against the second furniture board; or
in the installed state the covering cap is arranged at a distance from the second furniture board, and wherein the distance measures less than 10 millimeters.

22. The piece of furniture according to claim 19, wherein the second furniture board is arranged such that the second furniture board at least partially conceals the main body inserted in the cutout of the first furniture board.

23. A method for installing the furniture fitting according to claim 1 on a first furniture board, comprising:
providing the first furniture board having a cutout which is opened towards a front face and a side surface of the first furniture board;
inserting the main body of the furniture fitting at least partially into the first furniture board, wherein the at least one of the side surfaces of the main body remains accessible from the side surface of the first furniture board;
installing the covering cap on the main body, wherein in an installed state the at least one of the side surfaces of the main body is at least partially covered by the covering cap; and
adjusting the installation position of the covering cap relative to the main body.

24. The furniture fitting according to claim 5, wherein the variation range of the installation position of the covering cap relative to the main body is at least 10 millimeters.

25. The furniture fitting according to claim 7, wherein the covering cap is configured to be detachably fastened to the at least one of the side surfaces of the main body exclusively by the fastening device.

26. The furniture fitting according to claim 8, wherein the at least one retaining element is a resilient retaining element, and wherein at least one catch means, which is configured to be applied to a rear side of the at least one of the side surfaces which is opposite a front side facing the covering cap, is arranged on the at least one retaining element.

27. The furniture fitting according to claim 9, wherein
the fastening device includes a tooth system, wherein the tooth system is configured to be fastened to the covering cap on at least one bar with a catch mechanism, or
the fastening device is configured to be installed on the main body by engaging in at least one opening, or
an installation position of the fastening device is adjustable relative to the covering cap without tools.

28. The furniture fitting according to claim 1, wherein
the fastening device is configured to be fastened to the covering cap, or
the fastening device is configured to be installed on the main body magnetically, or
an installation position of the fastening device is adjustable relative to the main body without tools.

29. The furniture fitting according to claim 1, wherein the centering aid comprises a centering protrusion and a centering opening, and
wherein the centering protrusion is arranged on the covering cap, or the centering opening is arranged on the at least one of the side surfaces of the main body and the centering protrusion is configured to be arranged in the centering opening.

30. The furniture fitting according to claim 15, wherein the attachment part is configured to be detachably fastened to the covering cap by plugging in, and wherein the attachment part has a logo printed thereon.

31. The piece of furniture according to claim 16, wherein the first furniture board is provided as a side wall of the furniture carcass.

32. The piece of furniture according to claim 17, wherein the cutout is a milled cutout, wherein the cutout is shaped such that the main body can be inserted substantially completely into the first furniture board, and wherein the at least one of the side surfaces of the main body remains accessible from the side surface of the first furniture board.

33. The piece of furniture according to claim 18, wherein in an installed state the covering cap protrudes beyond the side surface of the first furniture board.

34. The piece of furniture according to claim 19, wherein the second furniture board is provided as a top panel of the furniture carcass.

35. The piece of furniture according to claim 20, wherein the second furniture board has an outside surface, which faces away from the main body, and a front face of the first furniture board is arranged substantially flush-mounted with the outside surface of the second furniture board.

36. The piece of furniture according to claim 21, wherein in the installed state the covering cap is arranged at the distance from the second furniture board, and wherein the distance measures less than 5 millimeters.

37. The method according to claim 23, wherein the first furniture board is provided as a side wall of a furniture carcass,
wherein the adjusting of the installation position is performed without tools, and is adjusted depending on a thickness of a second furniture board, and wherein the second furniture board is provided as a top panel of the furniture carcass and is configured to be connected to the first furniture board.

38. The furniture fitting according to claim 1, wherein the fastening device is at least partially integrated in the main body.

39. A furniture fitting for movably mounting a furniture flap on a furniture carcass, comprising:

a main body having two side surfaces which are shaped substantially identically and are parallel to each other;

a covering cap, wherein the main body is configured to be at least partially inserted in a furniture board of the furniture carcass, wherein the covering cap is configured to be installed on the main body so as to at least partially cover at least one of the side surfaces of the main body, and wherein an installation position of the covering cap is adjustable relative to the main body;

a fastening device, wherein the covering cap is configured to be fastened to the main body with the fastening device, wherein the fastening device is formed as a magnet; and a centering aid for fitting the covering cap on the main body during installation, wherein the main body has a front face with an opening for an actuating arm to extend through in at least one open position, the opening extending in a length direction, and wherein the installation position of the covering cap is adjustable relative to the main body at least in a direction substantially parallel to the length direction of the opening.

40. A furniture fitting for movably mounting a furniture flap on a furniture carcass, comprising:

a main body having two side surfaces which are shaped substantially identically and are parallel to each other;

a covering cap, wherein the main body is configured to be at least partially inserted in a furniture board of the furniture carcass, wherein the covering cap is configured to be installed on the main body so as to at least partially cover at least one of the side surfaces of the main body, and wherein an installation position of the covering cap is adjustable relative to the main body;

a fastening device, wherein the covering cap is configured to be fastened to the main body with the fastening device, wherein the fastening device is formed as a magnet; and a centering aid for fitting the covering cap on the main body during installation, wherein the centering aid comprises a centering protrusion and a centering opening, and wherein the centering protrusion is arranged on the covering cap, the centering opening is arranged on the at least one of the side surfaces of the main body and the centering protrusion is configured to be arranged in the centering opening.

* * * * *